(12) United States Patent
Gudesen

(10) Patent No.: US 11,785,920 B2
(45) Date of Patent: Oct. 17, 2023

(54) MARINE BIOPRODUCTION FACILITY

(71) Applicant: Hans Gude Gudesen, Lucerne (CH)

(72) Inventor: Hans Gude Gudesen, Lucerne (CH)

(*) Notice: Subject to any disclaimer, the term of this patent is extended or adjusted under 35 U.S.C. 154(b) by 763 days.

(21) Appl. No.: 16/484,455

(22) PCT Filed: Feb. 27, 2018

(86) PCT No.: PCT/NO2018/050050
§ 371 (c)(1),
(2) Date: Aug. 8, 2019

(87) PCT Pub. No.: WO2018/156031
PCT Pub. Date: Aug. 30, 2018

(65) Prior Publication Data
US 2020/0029535 A1 Jan. 30, 2020

(30) Foreign Application Priority Data

Feb. 27, 2017 (NO) .................................. 20170280

(51) Int. Cl.
*A01K 61/60* (2017.01)
*A01K 61/54* (2017.01)
(Continued)

(52) U.S. Cl.
CPC .............. *A01K 61/60* (2017.01); *A01G 7/045* (2013.01); *A01G 33/00* (2013.01); *A01K 61/54* (2017.01)

(58) Field of Classification Search
CPC ........ A01K 61/50; A01K 61/51; A01K 61/53; A01K 61/54; A01K 61/55; A01K 61/60;
(Continued)

(56) References Cited

U.S. PATENT DOCUMENTS

| 3,702,566 A | 11/1972 | Obermaier et al. |
| 4,377,987 A | 3/1983 | Satre |

(Continued)

FOREIGN PATENT DOCUMENTS

| CN | 102835363 A | 12/2012 | |
| EP | 1852015 A1 * | 11/2007 | ........... A01K 61/002 |

(Continued)

OTHER PUBLICATIONS

Extended European Search Report in corresponding European Application No. 18757308.4, dated Dec. 8, 2020.
(Continued)

*Primary Examiner* — Trinh T Nguyen
(74) *Attorney, Agent, or Firm* — Hershkovitz & Associates, PLLC; Abe Hershkovitz

(57) ABSTRACT

A marine bioproduction facility for farming of sessile marine organisms in a body of water is disclosed. The facility comprises an array of at least two production modules in contiguous geometrical relationship to each other, where each of the at least two production modules is adapted to be arranged within a vertical column with a predefined horizontal cross section and extending downwards from the water surface, where at least one of the at least two production modules comprises at least one growth surface for sessile marine organisms, and an upper part comprising at least one opening adapted to allow access to the vertical column. Further, a method for growth and harvesting of marine sessile organisms using the marine bioproduction facility is presented.

41 Claims, 22 Drawing Sheets

(51) Int. Cl.
*A01G 7/04* (2006.01)
*A01G 33/00* (2006.01)

(58) Field of Classification Search
CPC ........ A01K 61/70; A01K 61/75; A01K 61/30; A01K 61/17; Y02A 40/81
See application file for complete search history.

(56) References Cited

U.S. PATENT DOCUMENTS

| | | |
|---|---|---|
| 5,269,254 A | 12/1993 | Gagliano et al. |
| 5,515,813 A | 5/1996 | Wilkerson |
| 6,044,798 A | 4/2000 | Foster et al. |
| 6,520,116 B1 | 2/2003 | Jefferds |
| 9,339,016 B1 * | 5/2016 | Donovan ............... A01K 61/65 |
| 2006/0065204 A1 | 3/2006 | Stence, Jr. |
| 2008/0029040 A1 * | 2/2008 | Quinta Cortinas .... A01K 61/54 119/208 |
| 2011/0017144 A1 * | 1/2011 | Calinski ................ A01K 61/60 119/200 |
| 2014/0321913 A1 * | 10/2014 | Goei ....................... E02B 3/046 405/21 |
| 2016/0286767 A1 | 10/2016 | Newell |
| 2017/0027136 A1 | 2/2017 | Newell |
| 2017/0196206 A1 | 7/2017 | Ross |

FOREIGN PATENT DOCUMENTS

| | | | |
|---|---|---|---|
| FR | 2586895 A1 | 3/1987 | |
| JP | H01146850 U | 10/1989 | |
| JP | H05207831 A | 8/1993 | |
| JP | 2016150273 | * 8/2016 | ............. Y02A 40/81 |
| WO | WO 99/56535 A1 | 11/1999 | |
| WO | WO 2006/063412 A1 | 6/2006 | |
| WO | WO 2010/139832 A1 | 12/2010 | |
| WO | WO 2011/158215 A3 | 12/2011 | |

OTHER PUBLICATIONS

English language Abstract of FR 2586895 A1 (Mar. 13, 1987).
Machine-generated English language translation of Specification of JP H01146850 U (Oct. 11, 1989).
English language Abstract of CN 102835363 A (Dec. 26, 2012).
English language Abstract of Jp H05207831 A (Aug. 20, 1993).
International Search Report in International Application No. PCT/No. 2018/050050, dated Nov. 4, 2018.
Written Opinion of the International Searching Authority in International Application No. PCT/NO2018/050050, dated Nov. 4, 2018.

* cited by examiner

MARINE BIOPRODUCTION FACILITY

FIELD OF THE INVENTION

The present invention relates to infrastructure for the farming of organisms that grow in water, in particular sessile organisms. More particularly, the present invention relates to a marine bioproduction facility for farming of sessile marine organisms in a body of water, and a method for growth and harvesting of marine sessile organisms.

TECHNICAL BACKGROUND

Marine bioproduction facilities are found all over the world, in the form of tanks or net-based enclosures for fish and cable-based growth substrates for sessile organisms such as mussels, oysters, kelp, etc. Despite their obvious success in providing the world with food from the sea, floating facilities are beset by a range of problems that threaten their economic and ecological viability. Specifically, there is a need for improved control of the physical environment that governs the growth processes of the organisms to be cultivated, for avoidance of cross-contamination (chemical and biological) between the facilities and their environment, for sustainable supplies of feedstock to the farmed organisms, and for cost-effective equipment and procedures in all phases of the production. In particular, farming of sessile organisms is currently to a large extent dominated by traditional infrastructure and methods that are very labor intensive.

Prior art methods for farming of aquatic sessile organisms have to a large degree centered on cultivation of marine mollusks such as clams, mussels, oysters, winkles and scallops, employing ropes and cables for growth surfaces and suspension infrastructure in water. A much-used generic solution has been to create horizontal support structures in the form of cables connected to buoys and floats at the water surface, from which are suspended an underwater network of cables, weights and anchoring for defining the facility and keeping it in position, and for positioning a network of growth surfaces in the form of ropes, cables, chains, tubes, etc. Such solutions have several drawbacks, prominent among which are narrow settling areas and loss of teeming growth in a given area or volume (loss of produced biomass). Attempts have been made to remedy such problems by the introduction of trays, cages, meshes and ledges distributed along the length of vertical supporting cables. Examples of methods and apparatus for growing and/or gathering marine creatures and/or plants can be found in U.S. Pat. No. 3,702,599 (1972) to R. H. Herolzer, U.S. Pat. No. 4,377,987 (1983) to A. R. Satre, U.S. Pat. No. 5,515,813 (1996) to D. D. Wilkerson, and U.S. Pat. No. 6,520,116 B1 (2003) to I. W. Jefferds. Still, the fact remains that such prior art techniques involve labor intensive tending and harvesting procedures.

The same problems apply to current methods that are deemed particularly suitable for the farming of tunicates, where there are provided various designs with large settling surfaces distributed at depth. Known methods and apparatus for farming such marine animals can be found in, for example, Japanese Patent Application JP5305592A (1992) to M. Uwabe, PCT Application WO 99/56535 (1999) to K. Targotay et al., and PCT Application WO 2011/158215 A3 to C. Troedsson et al.

SUMMARY OF THE INVENTION

Accordingly, some objectives of the present invention are to:
provide a marine bioproduction facility for farming of sessile organisms, and a method for growth and harvesting of marine sessile organisms that solves problems related to the state of the art,
provide methods and infrastructures for farming of sessile marine organisms in bodies of water, centered around a production module which occupies a vertical water column within strictly defined external boundaries and which is equipped with standardized physical infrastructure for farming operations,
provide different types of production modules that can contain growth surfaces and closed tanks for bioreactors, protected habitats, storage, energy modules and production equipment,
provide configurations of a plurality of production modules linked side by side to form clusters of production modules that can be addressed individually,
provide clusters of production modules configured in linear or two-dimensional patterns,
provide linked clusters of production modules that can be arranged to provide enclosed habitats or barrier structures in water,
provide principles and procedures for automated or robot-assisted tending and harvesting of biological material from production modules with growth surfaces,
describe principles and provide macrostructures formed by linked clusters of production modules, and
provide macroscale marine bioproduction facilities comprising linked macrostructures formed by a plurality of linked clusters of production modules.

The present invention achieves the purposes set forth above by teaching a marine bioproduction facility for farming of sessile marine organisms in a body of water with a water surface, wherein the facility comprises at least one cluster. Each cluster comprises at least two production modules arranged side by side in a two-dimensional scalable and selectable pattern. Each of the two production modules is adapted to be operated independently of the other production modules and is confined within a vertical column with a pre-defined horizontal cross-section extending downwardly into the water from the surface. At least one of the two production modules comprises at least one growth surface for sessile marine organisms, and each of the two production modules comprises an upper part comprising at least one opening adapted to allow individual access to the vertical column in which the production module is arranged. The upper part of the at least one opening comprises a ring structure with an outer surface of a polygonal, circular or elliptical shape and has a positive buoyancy in water. The at least one production module comprises fixture and suspension structure for attachment, deployment and recovery of the at least one growth surface for sessile marine organisms.

According to another aspect of the invention, a method for growth and harvesting of marine sessile organisms according to a schedule pertaining to a production module, comprises exposing the opening in an upper part of the production module in preparation for insertion of a growth surface, inserting a growth surface through the opening into the production module, connecting the growth surface to fixtures on the upper part of the production module, incubating the growth surface in the production module for an incubation period, extracting the growth surface from the production module by pulling the growth surface through the opening in the upper part of the production module, and removing and collecting biomass from the extracted growth surface.

A marine sessile organism farming (bioproduction) facility is provided where a volume of water is employed as a controlled and protected growth region for marine organisms. In one embodiment of the present invention, a plurality of growth surfaces for sessile marine organisms extend vertically into the water, each located within a separate production module that is equipped with mounting fixtures on an upper part near the water surface and a lower part in the water below. The mounting fixtures maintain tension on the growth surfaces and keep them from mutual entanglement, and are adapted to interact with automatic equipment during farming operations.

The production modules may be arranged side by side with the upper parts of the production modules contacting each other to form a horizontal upper floor, e.g., in the form of annuli configured in a planar hexagonal close packed or square pattern. Likewise, the lower parts of the production modules may contact each other to form a lower floor maintained at a near-constant distance from the upper floor and with a geometry mirroring that of the upper floor.

The growth surfaces are typically in the shape of ribbons, webs, ropes, ladders or sheets, and may be segmented or be given different geometries along their length to accommodate different species of sessile organisms at different depths, and/or to cause specific hydrodynamic properties in the water.

Deployment, tending and harvesting of biomass-laden growth surfaces can be implemented manually, but preferred embodiments of the present invention include robotic equipment that is supported on the upper floor, straddling the upper part of the production modules and accessing specific locations during farming operations. Each production module in the bioproduction facility is typically equipped with a unique address which is stored in a computer and can be located by the onboard equipment.

The growth volume between the upper and lower floors may be open to the sea, allowing water and nutrients to be transported freely past the growth substrates. Alternatively, the volume may be partly or completely enclosed to provide a barrier between the interior of the bioproduction facility and the environment. Such barriers may be in the form of a perimeter wall of tanks or compartments extending between the upper and lower floors, or a set of impermeable curtains or screens stretched out in the water.

A first embodiment of the present invention is a marine bioproduction facility for farming of sessile marine organisms in a body of water with a water surface. The facility comprises at least one cluster, where each cluster comprises at least two production modules, where the production modules of each cluster are arranged side by side in a two-dimensional scalable and selectable pattern. Each of the at least two production modules is adapted to be operated independently of the other production modules, being confined within a vertical column with a pre-defined horizontal cross section and extending downwards from the water surface. At least one of the at least two production modules comprises at least one growth surface for sessile marine organisms. Each of the at least two production modules comprises an upper part comprising at least one opening adapted to allow individual access to the vertical column in which the production module is arranged. The upper part of at least one production module comprises a ring structure around the opening and has a positive buoyancy in water, where an outer circumference of the ring structure has one of the following shapes: polygonal, circular and elliptical. The at least one production module further comprises fixture and suspension structure for attachment, deployment and recovery of the at least one growth surface for sessile marine organisms.

The fixture and suspension structure optionally comprises a mounting fixture arranged on the upper part, where the at least one growth surface is connected to the mounting fixture, and the mounting fixture is adapted to pay out and suspend the at least one growth surface.

Optionally, the bioproduction facility comprises guiding structure for keeping the at least one growth surface within the corresponding vertical column.

At least one of the production modules may comprise at least one of the following: a tank with a tank volume, and technical equipment.

The guiding structure optionally comprises a retaining fixture arranged on a lower part of the production module, the retaining fixture comprising a guiding ring for the at least one growth surface.

Optionally, the growth surface is connected at its lower end to a cable which passes via a retaining fixture arranged on the lower part, and the cable returns to a take-up fixture on the upper part.

At least one production module may comprise a lower part adapted to be arranged below the upper part.

The lower part of at least one production module may comprise a ring structure, where an outer circumference of the ring structure has one of the following shapes: polygonal, circular and elliptical.

The guiding structure may comprise the ring structure of the lower part, and the at least one growth surface or a cable connected thereto that passes through the ring structure.

The lower part may have negative buoyancy in water.

The fixture and suspension structure may be arranged on the upper and lower parts of a given production module, and the suspension structure may be arranged between the upper and lower parts, wherein the fixture and suspension structure may be adapted to stretch the at least one growth surface between the upper and lower parts, and for deploying and retrieving the at least one growth surface through the opening in the upper part.

At least one growth surface for sessile organisms may be at least one of the following: sectioned as a function of depth in the vertical column, and formed as a helical strip adapted to be rotated about its vertical axis for causing movement of water in the body of water.

The tank volume may be accessed via the opening of the corresponding upper part.

The two-dimensional scalable and selectable pattern may be one of the following: random, serpentine, linear, triangular, square and hexagonal close-packed (HCP). The at least one cluster may have a polygon-shaped circumference having one of the following shapes: triangle, square, rectangle, pentagon and hexagon.

A production module may be mechanically linked to at least one neighboring production module.

The marine bioproduction facility may comprise an upper floor arranged to be floating at or near the surface of the body of water, where the upper floor comprises the upper parts of at least two production modules. The upper floor may comprise buoyancy modules for providing buoyancy to the upper floor.

The marine bioproduction facility can comprise a lower floor arranged to be submerged in the body of water, where the lower floor comprises the lower parts of the at least two production modules.

Further, the marine bioproduction facility may comprise a sub-floor arranged below the at least one cluster, and the sub-floor may be arranged for one or more of the following: collecting waste products, providing a habitat for bottom-living organisms and increasing the structural strength of the facility. The sub-floor may be one of the following: a mechanically stiff platform of annuli, tanks or cylinders linked side by side and adapted for carrying collection surfaces, and a sheet suspended below the cluster.

Further, the marine bioproduction facility may comprise a roof structure arranged above at least one cluster, where the roof structure is arranged for providing one or more of the following: environmental protection, a platform for technical installations, an area for growing light dependent cultures, and a solar power collector.

The production modules may have a unique production module address identifying its location in the facility. At least one growth surface may be sectioned, and each section can have a unique section address identifying its location in the corresponding production module. A cluster may have a unique cluster address identifying its location in the facility.

The marine bioproduction facility may comprise a perimeter structure at least partly surrounding at least one of the clusters. The perimeter structure may be one of the following: a linked structure adapted to float and surround the cluster in two dimensions and a closed barrier structure adapted to envelop the cluster partly or completely in the water.

The marine bioproduction facility may comprise at least one macroscale structure, where the macroscale structure comprises at least two clusters, where the at least two clusters are mechanically linked. The at least one macroscale structure may comprise at least one cluster with a polygon-shaped circumference. The at least one macroscale structure may comprise two or more triangular clusters. The polygonal cluster may be closed to surrounding water by a barrier comprising one or more of the following: a number of closed production modules in the shape of cylindrical tanks linked side by side and a sheet or curtain.

At least one macroscale structure can comprise at least two triangular clusters arranged such that the closed sides of the at least two polygonal clusters connect to form an extended closed barrier.

According to another embodiment of the invention, there is a method provided for growth and harvesting of marine sessile organisms using a marine bioproduction facility, wherein the method comprises:
defining actions according to a schedule pertaining to a production module,
exposing the upper part of the production module in preparation for insertion of a growth surface,
inserting a growth surface into the production module through an opening in its upper part,
connecting the growth surface to fixtures on the upper part of the production module,
incubating the growth surface in the production module for an incubation period,
extracting the growth surface from the production module by pulling it up through the opening in its upper part, and
removing and collecting biomass from the growth surface.

The method for growth and harvesting may, before exposing the upper part, comprise:
identifying a physical location of one or more of the following:
i) a cluster using the cluster address,
ii) a production module using the production module address, and
iii) a growth surface section using the section address.

The removing and collecting of biomass from the growth surface may be performed by one or more of the following processes: scraping, brushing, blowing, suction, shaking and beating.

The method for growth and harvesting of marine sessile organisms may, before incubating the growth surface, comprise the additional steps of:
connecting the growth surface to fixtures on a lower part of the production module, and
stretching the growth surface between the upper and lower parts on the production module.

The method for growth and harvesting of marine sessile organisms may comprise pre-seeding the growth surface with larvae or juveniles of the sessile marine organisms before inserting it into the production module.

At least one of the steps of the method may be performed by automated equipment, and optionally the at least one of the steps may be performed by a mobile robot.

The method for growth and harvesting of marine sessile organisms may comprise covering the upper part of one or more production modules by a removable light tight lid, shroud, tarp or housing, for protection from light during the incubation period.

BRIEF DESCRIPTION OF THE FIGURES

FIG. 16b shows a perspective view of the facility in FIG. 16a.

| List of used reference numbers | |
|---|---|
| Number | Designation |
| 1 | Upper part |
| 2 | Lower part |
| 3 | Mounting fixture |
| 4 | Take-up fixture |
| 5 | Retaining fixture |
| 5b | Weight |
| 6 | Retaining fixture |
| 7 | Growth surface |
| 8 | Cable |
| 9 | Attachment gear |
| 10 | Production module volume |
| 11 | Tank |
| 12 | Suspension cable |
| 13 | Sectioned growth surface |
| 14 | Helical strip |
| 15 | Vanes |
| 16 | Motor/windmill |
| 17 | Upper floor |
| 18 | Lower floor |
| 19 | Pillar |
| 20 | Sub-floor |
| 21 | Roof structure |
| 22 | Curtain |
| 23 | Tending/harvesting machine |
| 24 | Cylindrical enclosure |
| 25 | Closed wall |
| 26 | Water inlet tube |
| 27 | Collection surface |
| 28 | Separation and pumping device |
| 29 | Tube |
| 30 | Collection tank |
| 31 | Tube |

DETAILED DESCRIPTION OF THE INVENTION

The marine bioproduction facility is centered around production modules wherein each is adapted to be arranged within a vertical column with a pre-defined horizontal cross section and extending downwards from the water surface. Each production module may be dedicated to one of a wide range of activities related to the overall running of the production facility.

In the case of farming of sessile organisms, the production module typically comprises a buoyant upper part at the water surface and optionally a submerged lower part of comparable size and shape at the bottom of the water column. Within this water column, there are disposed growth surfaces, typically in the form of sheets, ribbons, tubes, plates, meshes, nets, ropes or cables, on which sessile plants or animals can settle and grow. Each growth surface is suspended from the upper part of the production module in such a way that it provides easy access from above for tending and harvesting of the growth surface below, and avoids entanglement with growth surfaces in neighboring production modules.

Examples of how this is achieved according to the present invention are shown in FIGS. 1a-f. The growth surfaces are suspended between a mounting fixture on the upper part of the production module and a guiding device on the lower part of the production module. The upper and lower parts are in the form of annuli (1), (2), each provided with fixtures for the attachment, deployment, manipulation and recovery of growth surfaces and associated suspension components and devices that are positioned between the upper and lower parts.

Mounting fixtures, suspension components (i.e. fixture and suspension structure) and growth surfaces may take many forms. In order to facilitate understanding of the operational description to follow, the simple configurations shown in FIGS. 1a-f shall now be described in more detail.

Figure 1A:
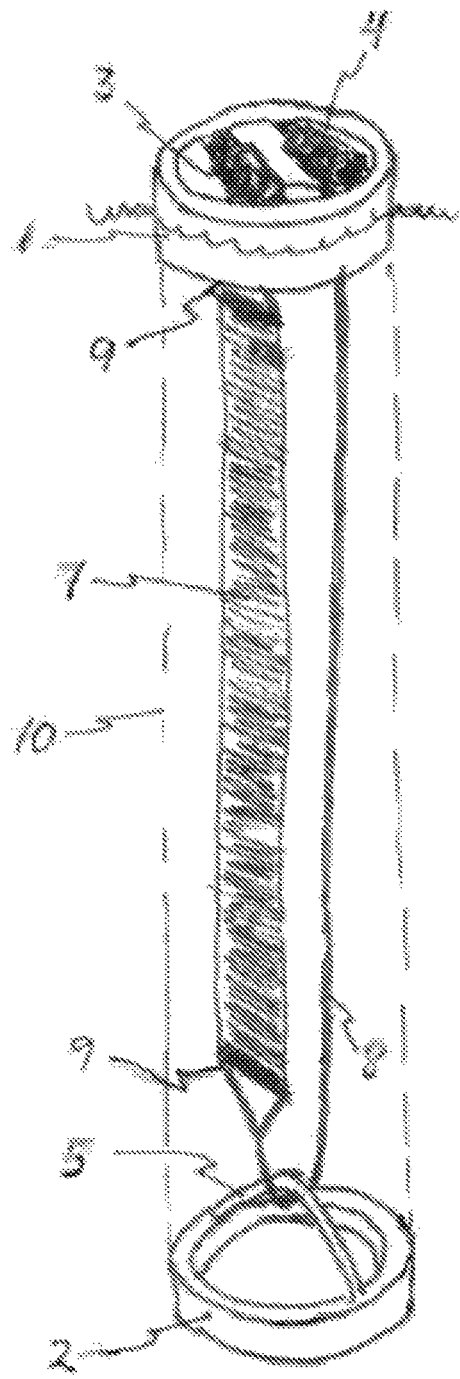
FIGS. 1a, 1b, 1c, 1d, 1e and 1f illustrate various configurations of a production module.
Figure 1B:
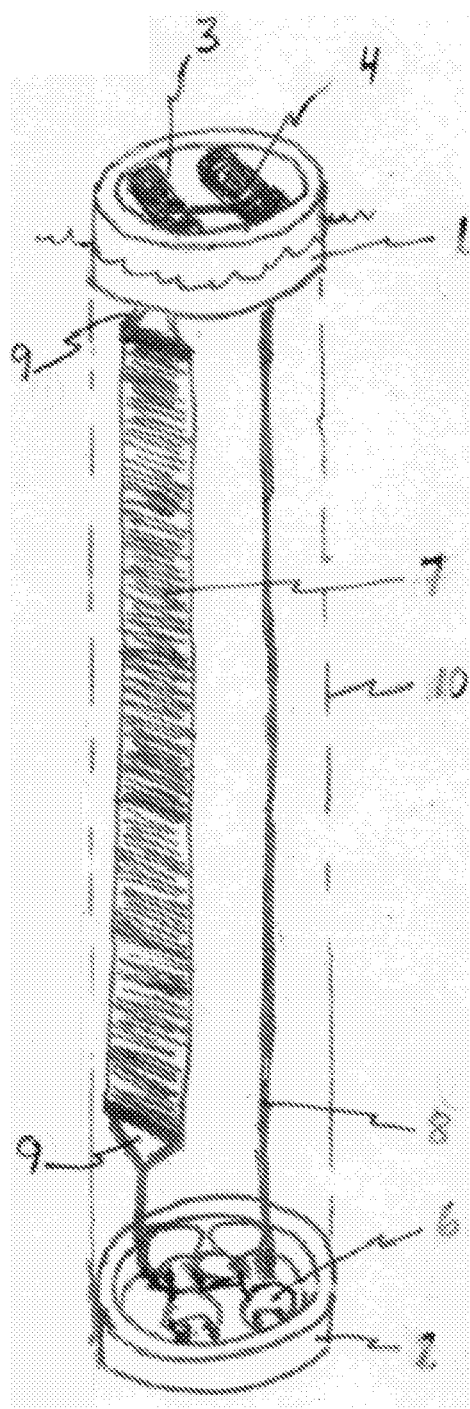

In FIGS. 1a and b, the growth surfaces are shown in the form of a longitudinal flat sheet (7) stretched between the fixtures on the upper and lower parts of the production module by way of a set of cables (8) and attachment gear (9). The cables are used for deploying and retrieving the growth surfaces through the opening in the upper part, and during the growth cycle they keep the growth surface in position within the volume occupied by the production module, indicated by the stippled lines (10). Spanning the annular upper part (1) is a first mounting fixture (3) from which the growth surface (7) is suspended via cable (8) and attachment gear (9). The growth surface is connected at the lower end to the cable (8) which passes via a retaining fixture (5), (6) on the submerged lower part (2) and returns to a take-up fixture (4) on the upper part (1). Being located at water depths that may reach 20-50 m. and more, the retaining fixtures (5), (6) must be fail safe, and two simple designs are illustrated in FIGS. 1a and b. In FIG. 1a, the retaining fixture is a shaped crossbar (5) which the cable (8) loops around as shown. In FIG. 1b, the cable is guided across rollers (6).

Figure 2:
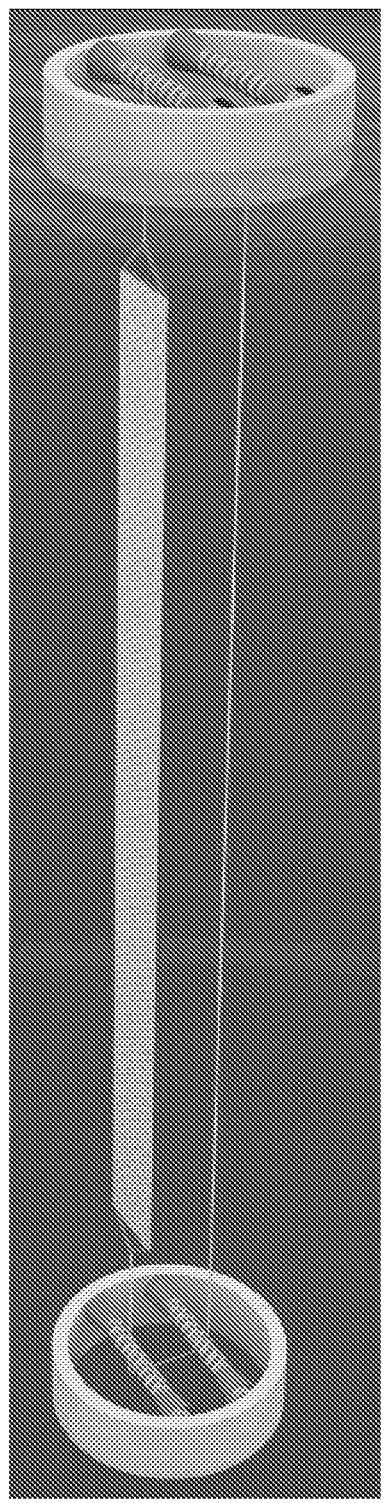
FIG. 2 shows a deployed production module.

Other retaining fixtures are possible, e.g., a smooth tube or chute. In many marine environments, strategies must be adopted to tackle perturbations in the form of wave and tide motion. This may involve transient partial buckling of growth surfaces and active take-up of slack in the mounting fixtures at the upper part and/or at the bottom part. Many mounting variants are possible within the basic suspension mode shown in FIGS. 1a and b. For clarity, a single production module similar to the one shown in FIG. 1b is shown in FIG. 2, without reference numbering.

Figure 1C:
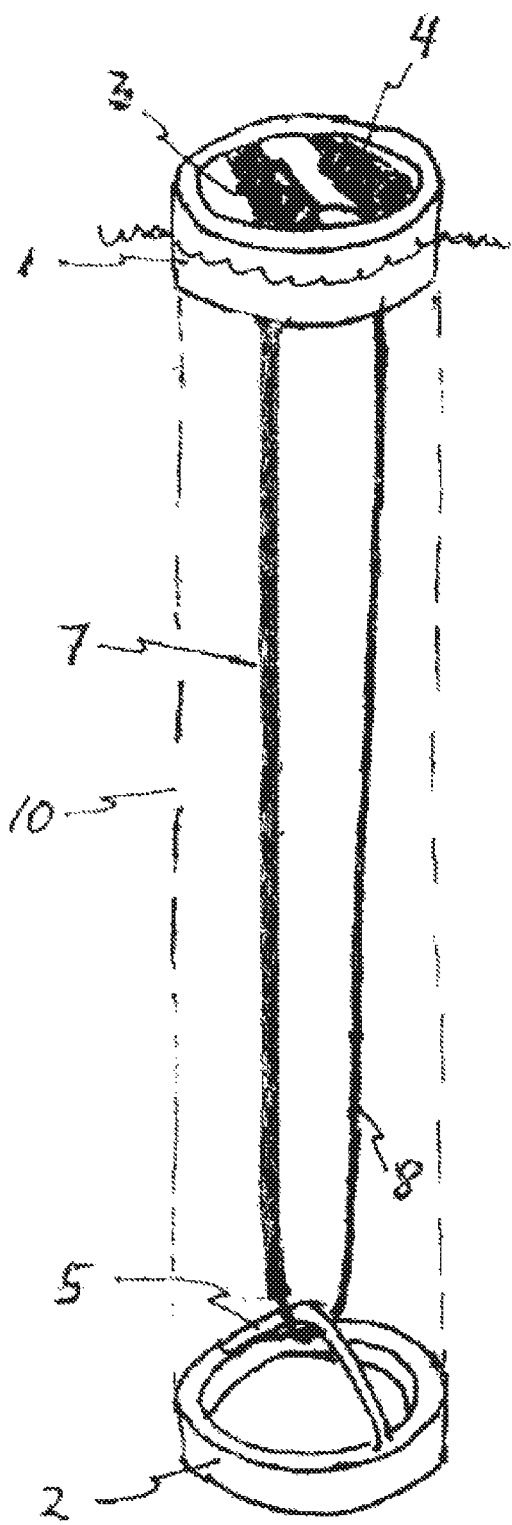

In FIG. 1c, the growth surface (7) has a cylindrical shape, typically being a thick rope or cable. The growth surface (7) is connected at the lower end to the cable (8) which passes via a retaining fixture (5) on the submerged lower part (2) and returns to a take-up fixture (4) on the upper part (1). When two elements are described as being connected, this may refer to a direct connection or a connection via a connecting element, and a cable as a connecting element should be broadly interpreted as an elongated member fitted for the connection purpose.

Figure 1D:
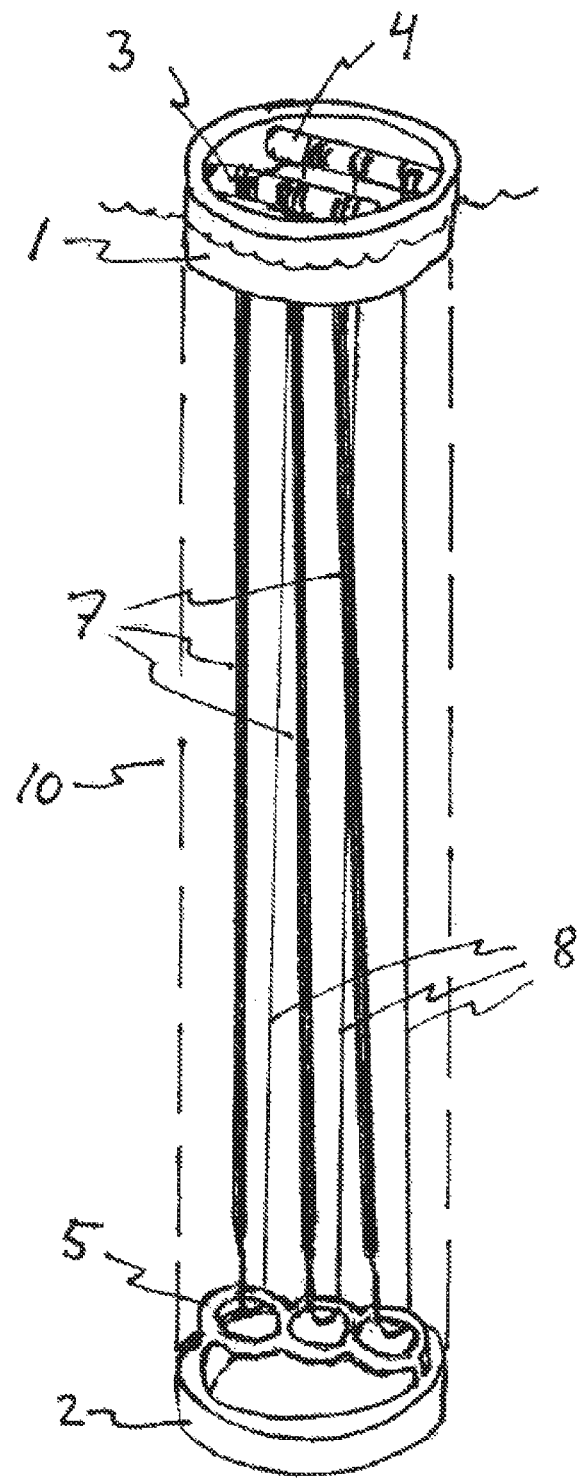

Slender growth surfaces in the form of ropes or cables allow more than one growth surface to be accommodated in a single production module. In FIG. 1d, 3 growth surfaces (7) are stretched between a first mounting fixture (3) on the upper part (1) and a retaining fixture (5) with three guiding rings on the lower part (2). Each growth surface is connected at its lower end to a cable (8) which runs through a guiding ring on the lower part (2) and up to a take-up fixture (4) on the upper part. There exist alternative embodiments when it comes to the numbers of growth surfaces and geometric arrangements illustrated in FIG. 1d.

Figure 1E:
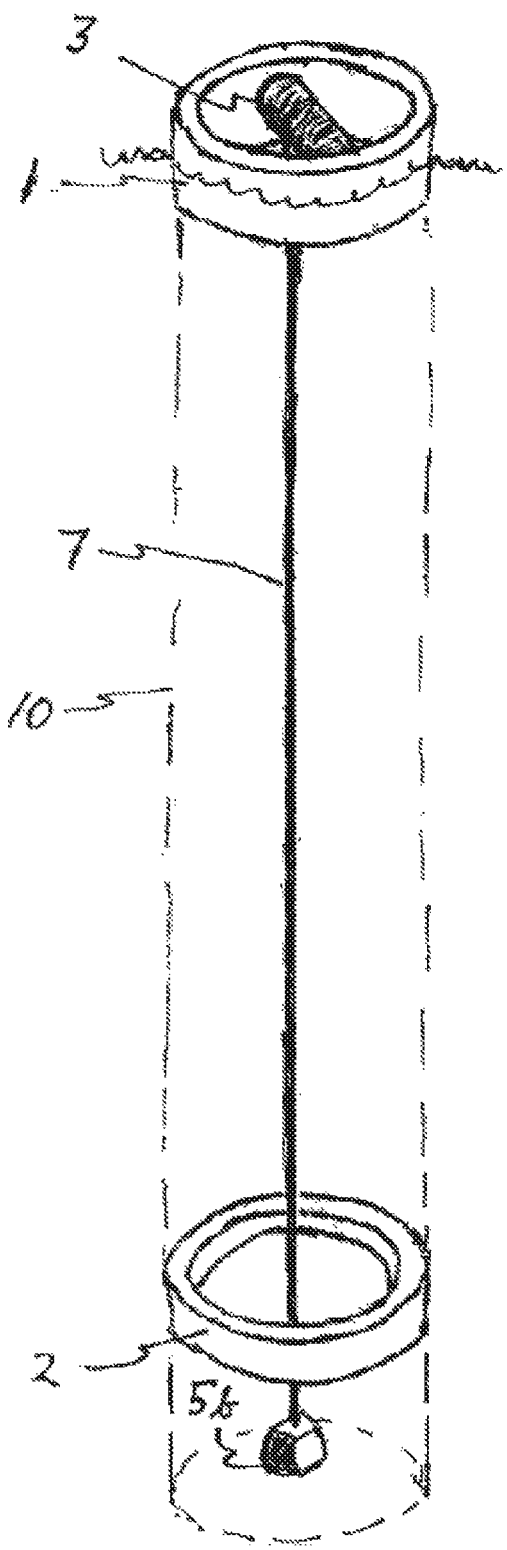

In FIG. 1e, the growth surface (7), here shown as a rope, is suspended from a combined pay-out and take-up fixture (3) on the upper part, being kept extended by a weight (5b).

This has the advantage of simplicity, but may in certain cases be less than optimal due to the cumulative burden on the flotation part of the facility, and the danger of entanglement in facilities with a dense distribution of growth surfaces. One strategy to avoid entanglement is to use the lower part (2) as a separation device, where the growth surface (7) and weight (5b) are passed through the lower part and extend below it as illustrated in FIG. 1d.

Figure 1F:
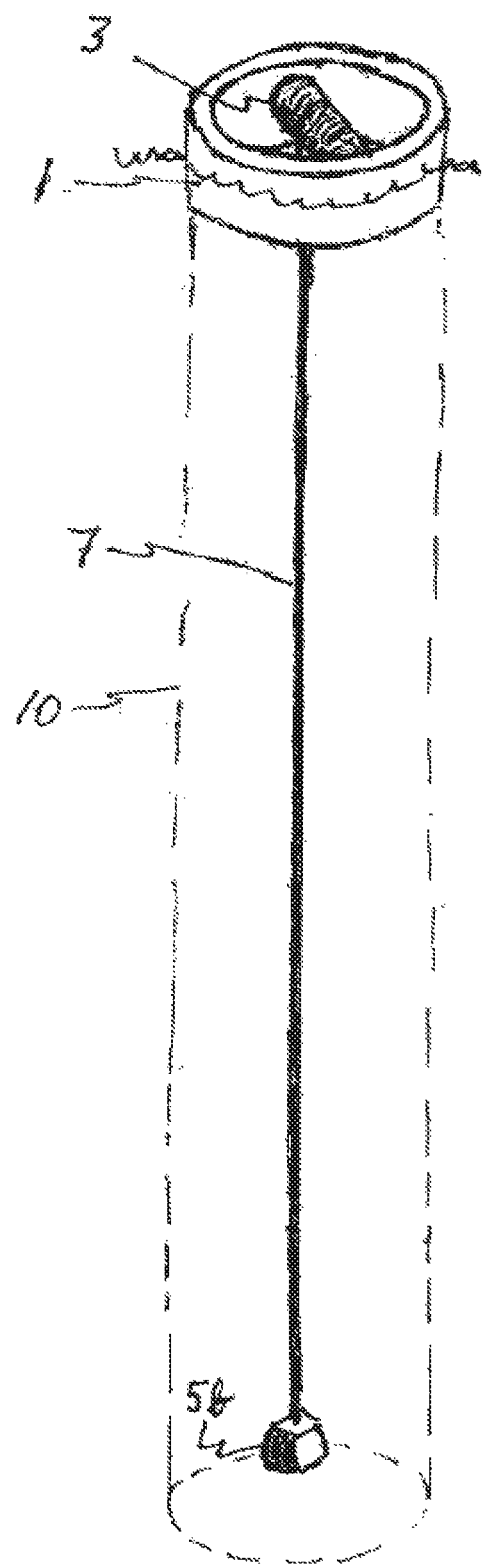

FIG. 1f illustrates a simplified version of the arrangement shown in FIG. 1e, where there is no lower part to guide the suspended growth surface (7). Such arrangements are particularly relevant in situations where there is little or no water flow, e.g., in tanks or protected habitats, or where the growth surfaces are short compared to their nearest neighbor spacing.

The growth surfaces are typically in the form of a ribbon, sheet, cable, rope, web, net or tube, with a width less than the opening in the upper part and a length of up to several tens of meters. The growth surfaces are specifically adapted to accommodate sessile organisms such as tunicates which attach permanently to the growth surface early in their life cycles and grow from nutrients picked up from the surrounding water, which may either be open volumes in natural bodies of water or enclosed volumes in tanks or other enclosures. Such organisms include a wide variety of species, including tunicates, mussels, clams, barnacles, sponges, hydra and corals as well as macroalgae and seagrass. The growth surfaces may be segmented or be given different geometries along their length to accommodate different species of sessile organisms at different depths, and/or to present specific hydrodynamic properties in the water. Thus, they may be shaped and mounted so as to flutter or rotate in response to water flowing past, to increase exposure to nutrients. Conversely, they may cause water to be transported, e.g., in an upwelling fashion, when the growth surfaces are subjected to forced motion, e.g., rotation, from a motor attached to the mounting fixtures or by mechanical vanes and propellers driven by winds or water currents.

Figure 3E:
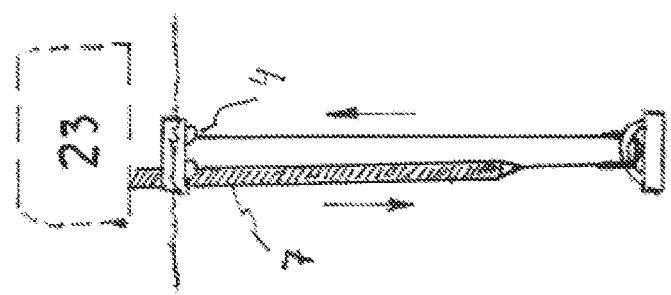
FIGS. 3a, 3b, 3c, 3d and 3e illustrate a growth and harvesting cycle in a production module.
Figure 3D:
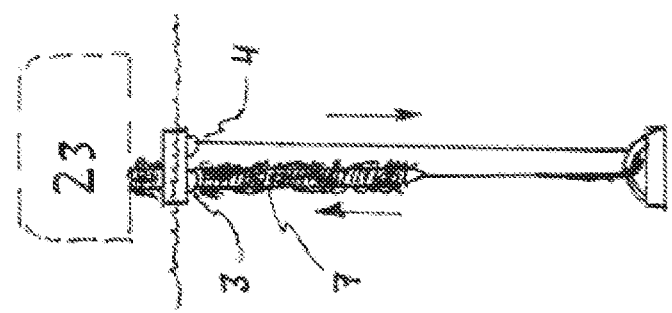
Figure 3C:
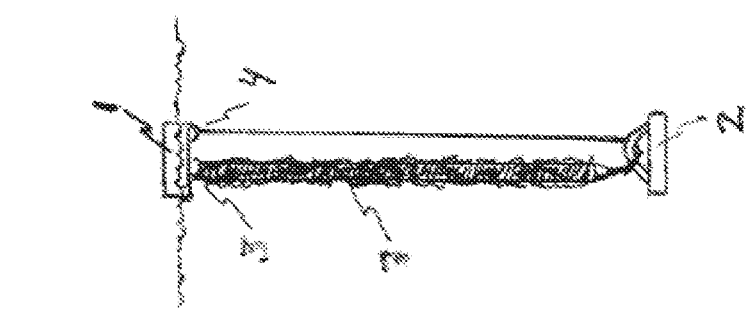
Figure 3B:
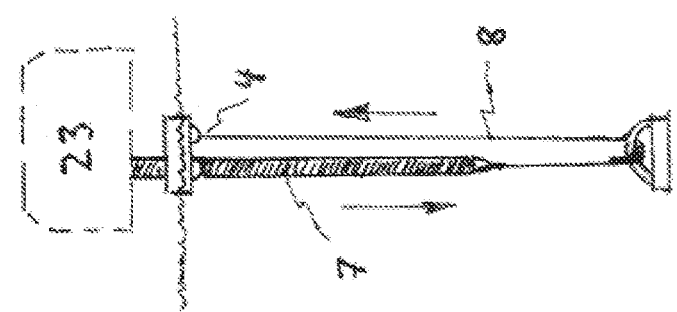
Figure 3A:
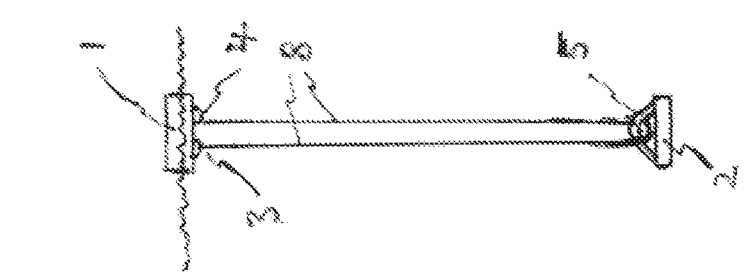

A complete growth and harvesting cycle for sessile organisms which settle naturally from the surrounding water volume (e.g., tunicates) shall typically proceed as illustrated in FIGS. 3a-e. FIG. 3a shows a production module similar to that shown in FIG. 1a in readiness before the cycle is initiated: A cable (8) passes from the mounting fixture (3) on the upper part (1) and down to the retaining fixture (5) on the lower part (2) where it loops back to the take-up fixture (4). In FIG. 3b, the cable (8) has been connected to the bottom end of a growth substrate (7) which is being fed down into the water from a tending/harvesting machine (23) while the cable is pulled up at the take-up fixture (4). FIG. 3c shows the normal growth situation where the growth surface (7) is extended between the upper and lower parts (1), (2), being kept suitably taut and in position by the mounting and take-up fixtures (3), (4). FIG. 3d shows the situation in the harvesting phase: The growth surface (7) has been released from the mounting fixture (3) and is drawn out of the water and into the tending/harvesting machine (23), while cable is being paid out by the take-up fixture (4). The tending/harvesting machine (23) clears the biomass from the substrate and cleans it. In FIG. 3e, the growth surface (7) is returned down into the water, assisted by coordinated pulling on the cable at the take-up fixture (4). Once in place as illustrated in FIG. 3c, a new growth cycle can begin. As an alternative to using cleaned substrates that are seeded opportunistically by larvae in the water volume surrounding the production module, it is also possible to incubate the growth surface in a separate controlled environment before it is returned into the production module as shown in FIG. 3e.

Figure 4:
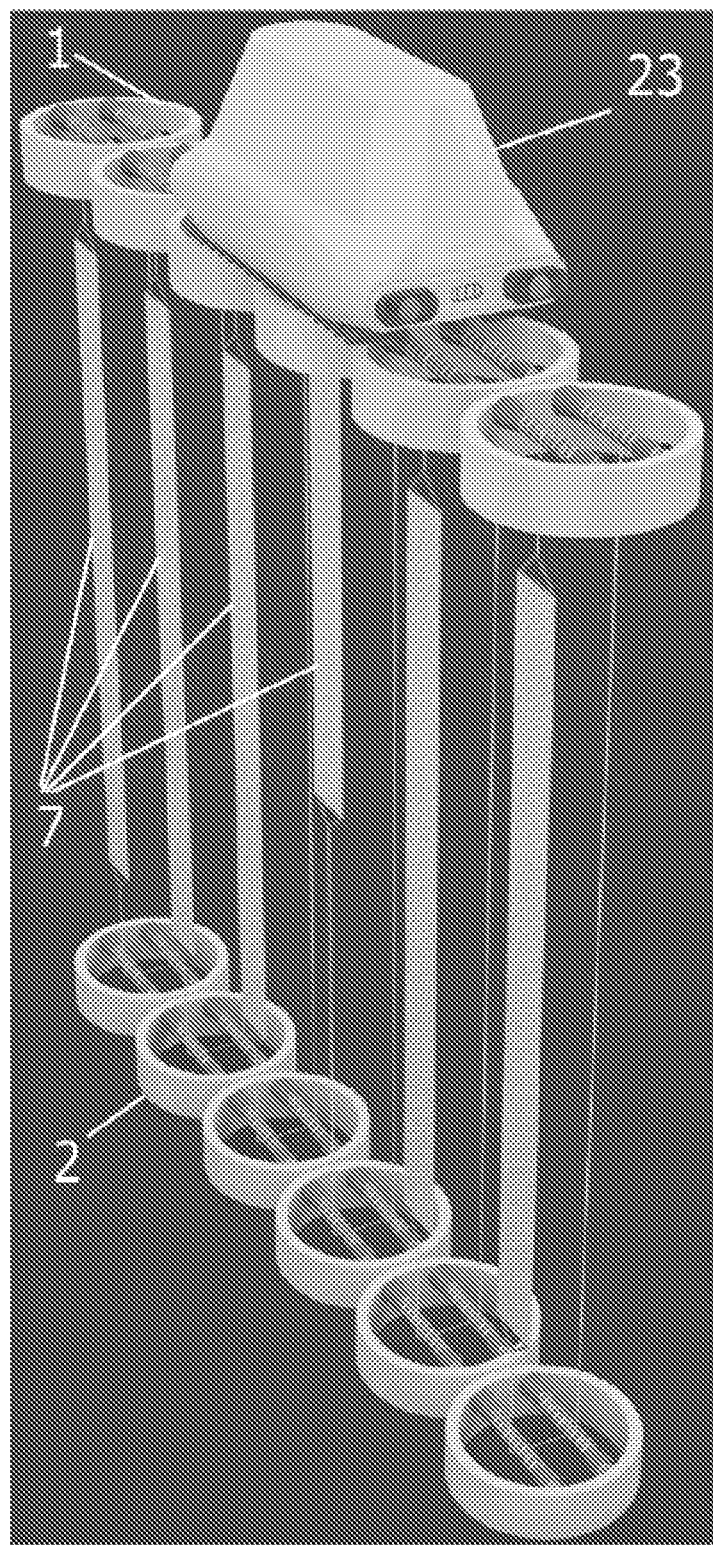
FIG. 4 shows a linear cluster of production modules being tended by a tending/harvesting machine.

In practical farming facilities, a plurality of production modules are arranged side by side in a dense packing pattern, termed a "cluster" and described as follows. FIG. 4 shows a cluster in the form of a linear array comprising 6 production modules of the type shown in FIG. 2, with upper (1) and lower (2) parts and a tending/harvesting machine (23) in the process of lowering a growth surface (7), cf. the process stage illustrated in FIG. 3b.

Figure 5:
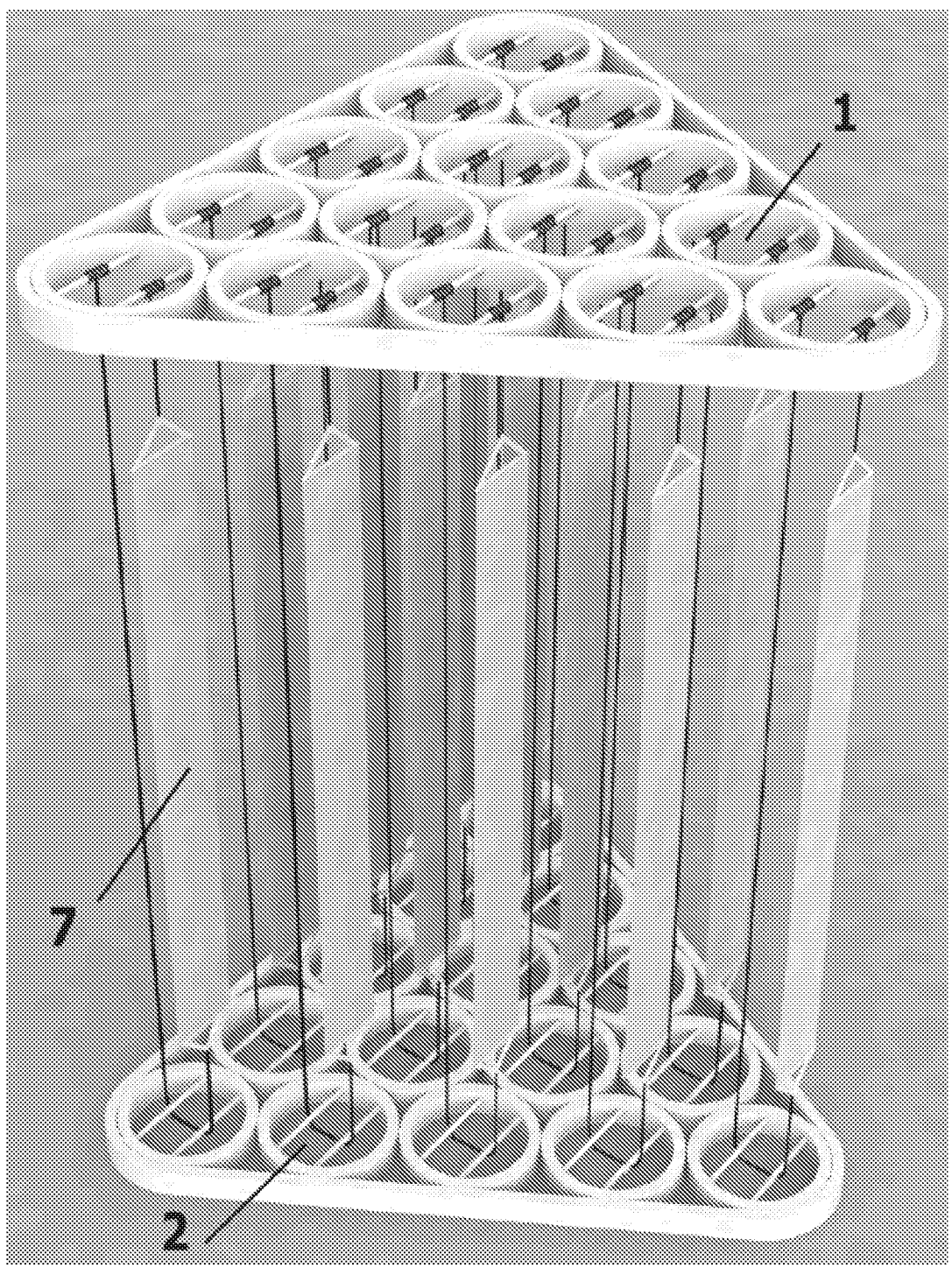
FIG. 5 shows a triangular cluster of production modules with circular horizontal footprints.
Figure 6A:
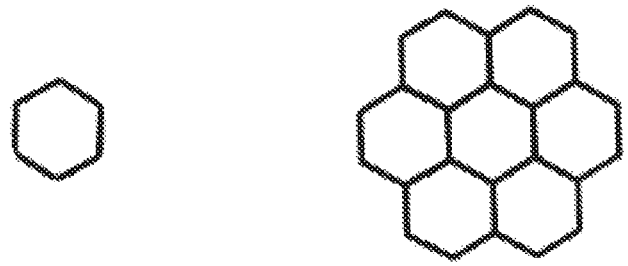
FIGS. 6a, 6b and 6c illustrate single production modules with polygonal horizontal footprints arranged in clusters.
Figure 6B:
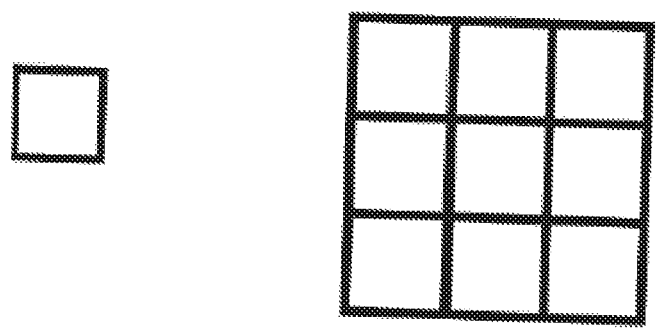
Figure 6C:
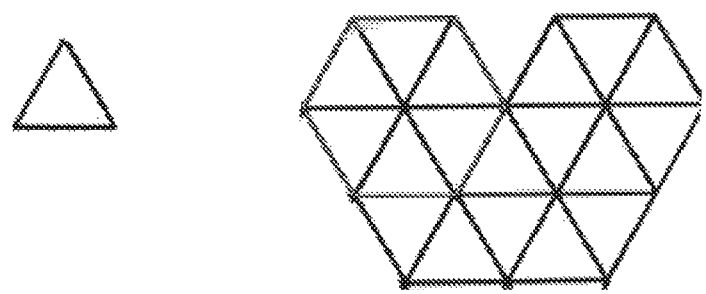

More generally, production modules are assembled in two dimensional clusters, as exemplified in FIG. 5 and FIGS. 6a-d, where clusters are formed by arranging individual production modules in close packed patterns. FIG. 5 shows a preferred embodiment in the form of a triangular cluster with a "floor" of buoyant upper parts (1) at the surface, mirrored by a "floor" of lower parts (2) below, and with growth surfaces (7) suspended between them. The upper and lower floors are framed into a triangular shape where the annular upper and lower parts of each production module are packed in a hexagonal close packed (HCP) arrangement. FIGS. 6a-c show top views of polygon-shaped production modules (left side in figures) and examples of cluster arrangements (right side in figures). Other shapes and cluster arrangements are possible.

Figure 7:
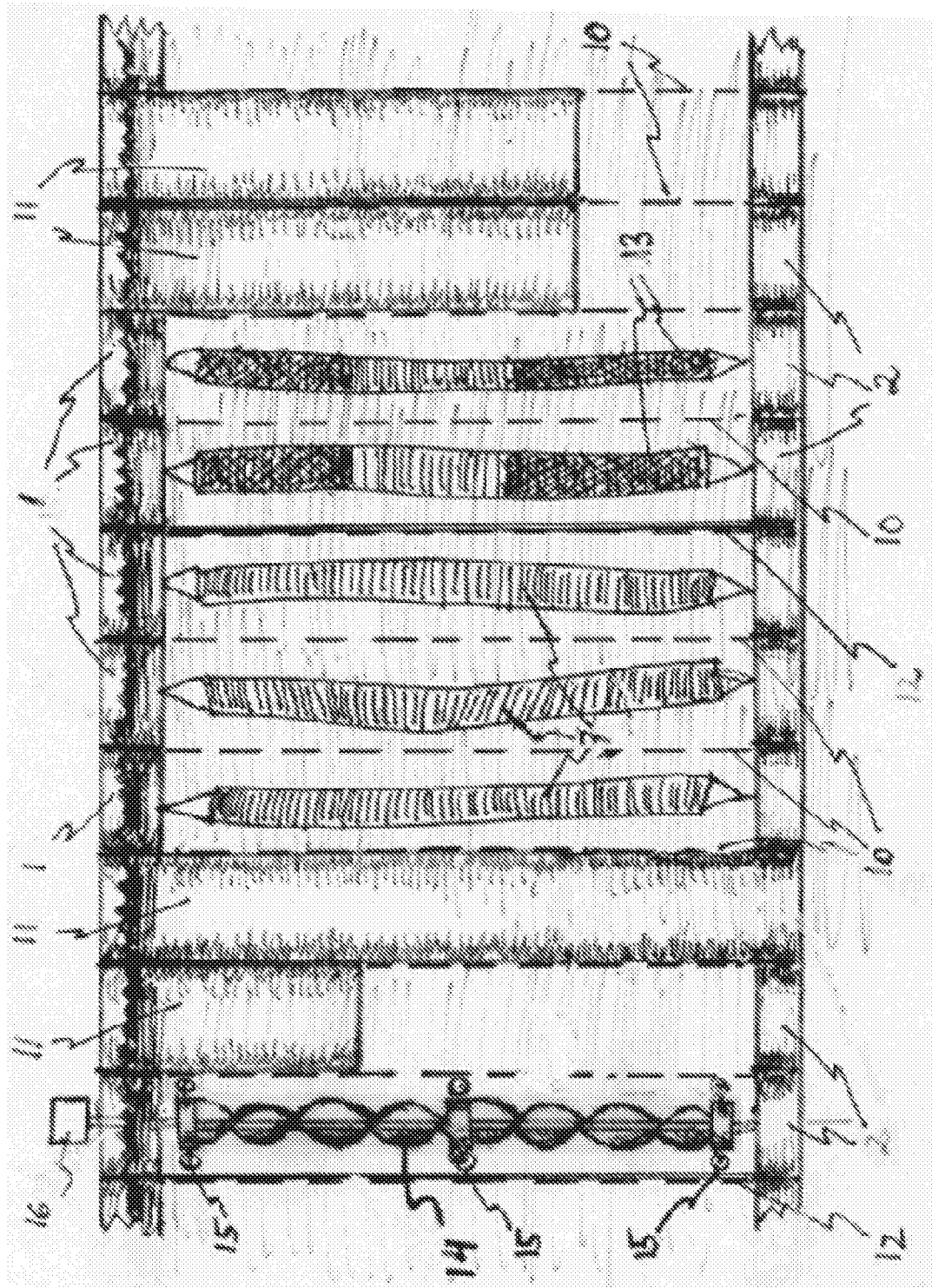
FIG. 7 shows a cluster of production modules comprising different configurations of production modules.

The basic concept of production modules occupying specific water columns can also include production modules with other functionalities than presenting growth surfaces to sessile organisms, e.g., as storage tanks and technical service equipment. FIG. 7 shows a cluster of production modules of different types in a side view. Each production module occupies an allocated volume in the water indicated by the stippled lines (10) in FIG. 7. In addition to production modules that are open to the water and contain growth surfaces (7) suspended between a buoyant upper part (1) and a submerged lower part (2), there are production modules in the form of tanks (11) that are closed to the surrounding water volume. The tanks extend into the water as shown in FIG. 7 and may in principle be of any length. In many cases suspension cables (12) linking buoyant parts at the surface and submerged parts below may be included in the cluster to stabilize the overall structure.

Examples of production modules in the form of closed tanks include the following:

Containment: The organisms being grown are freely moving or drifting in the water, e.g., larvae or micro-algae, and need to be restricted within a given volume, Incubation: The volumes inside the tanks provide a controlled and protected environment where organisms in early stages of development can be seeded and nurtured in preparation for being transferred to various production volumes in the facility or elsewhere.

Storage vessels. These are tanks that contain feedstock for the bioproduction, chemical additives to feedstock, temporary storage of harvested biomaterial, and industrial chemicals for machinery and technical installations in the production facility.

Energy modules: Energy may be produced and stored as well as consumed in the production facility, requiring storage volumes for liquids and gases. Thus, closed compartments may be dedicated to the storage of fuel and compressed air.

Tanks for buoyancy and ballasting control of the production facility or parts of it.

Certain essential features and advantages of the present invention can be discerned by inspection of FIG. 5 and FIGS. 6a-c:

Each production module can be accessed and operated individually, without disturbing the others. This implies that production modules can be added to or removed from clusters, and organisms at different development stages can be farmed in neighboring production modules. Thus, by moving systematically across the array according to a predefined time schedule, it becomes possible to achieve continuous farming where seeded growth surfaces are deployed and mature growth surfaces are harvested in parallel operations. Another option is parallel multiculture farming, where different production modules carry different species, or a single production module carries different species on growth surfaces that are sectioned according to depth in the water column, cf. the sectioned growth surfaces (13) in FIG. 7. In some production modules, growth surfaces may be given special geometries in order to perform other tasks in addition to hosting sessile organisms: FIG. 7 illustrates a growth surface formed as a helical strip (14). When the strip is rotated about a vertical axis, water will be propelled upwards or downwards, depending on the direction of rotation, causing upwelling or downwelling in the local environment within the cluster. The rotation may be driven by water currents via vanes (15) attached to the strip, or from the top by way of a motor or windmill (16).

Each production module in a cluster can be assigned a unique address. This makes it possible to tailor and optimize farming operations for each production module, and to employ robots and sensors in a highly automated environment.

Figure 8:
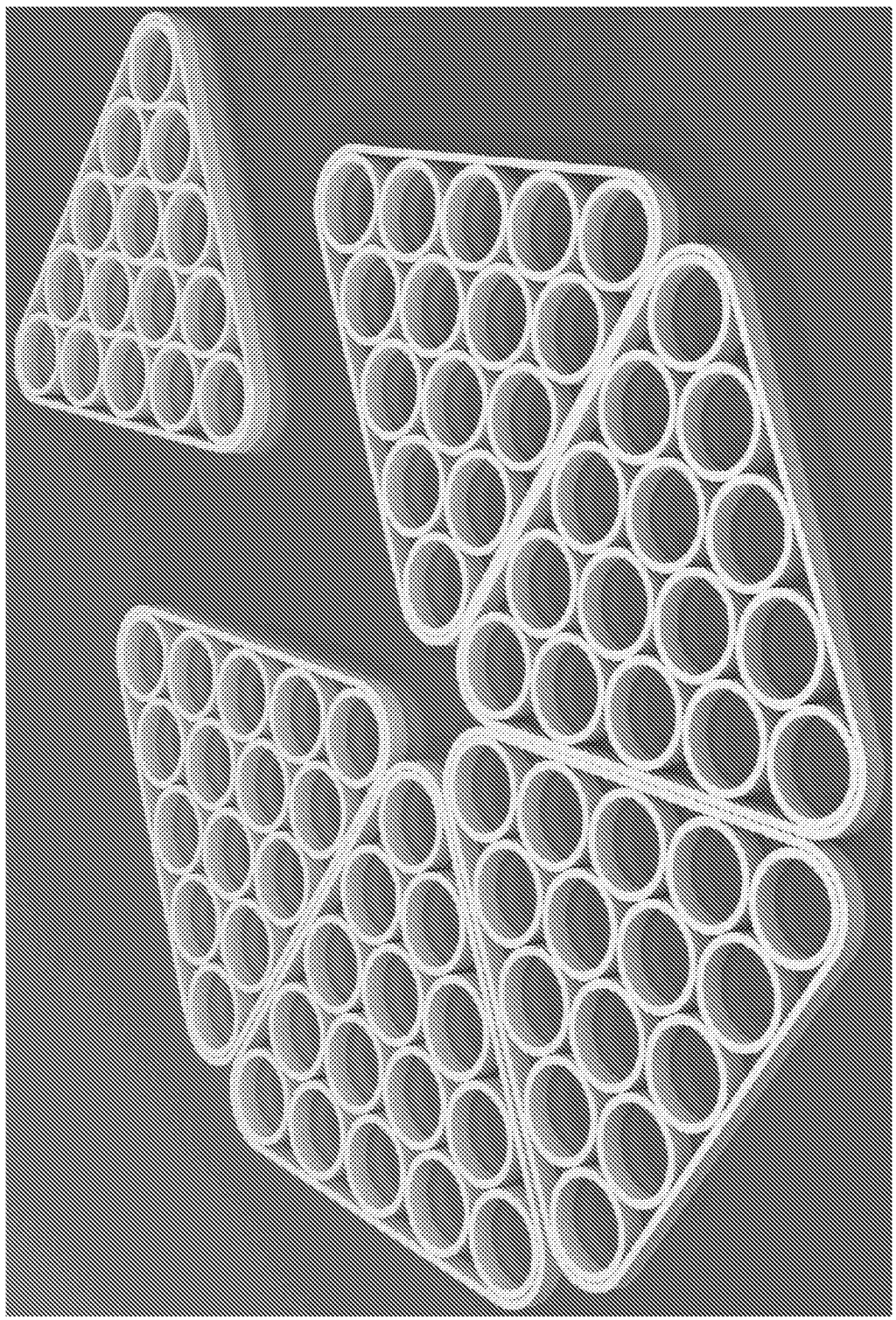
FIG. 8 shows clusters of production modules linked to form macrostructures.
Figure 9:
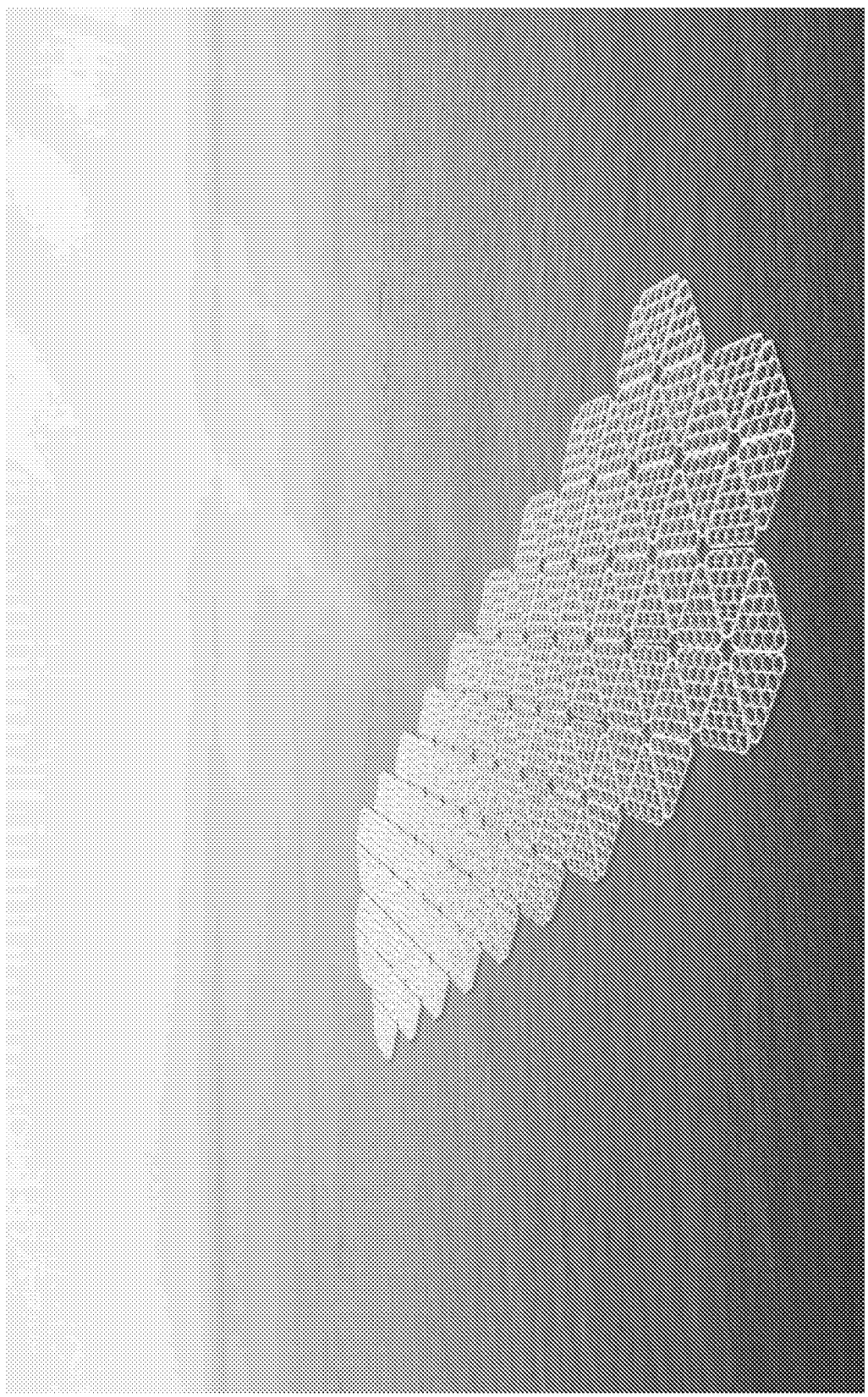
FIG. 9 shows a macrostructure comprising a plurality of triangular clusters of production modules.
Figure 10:
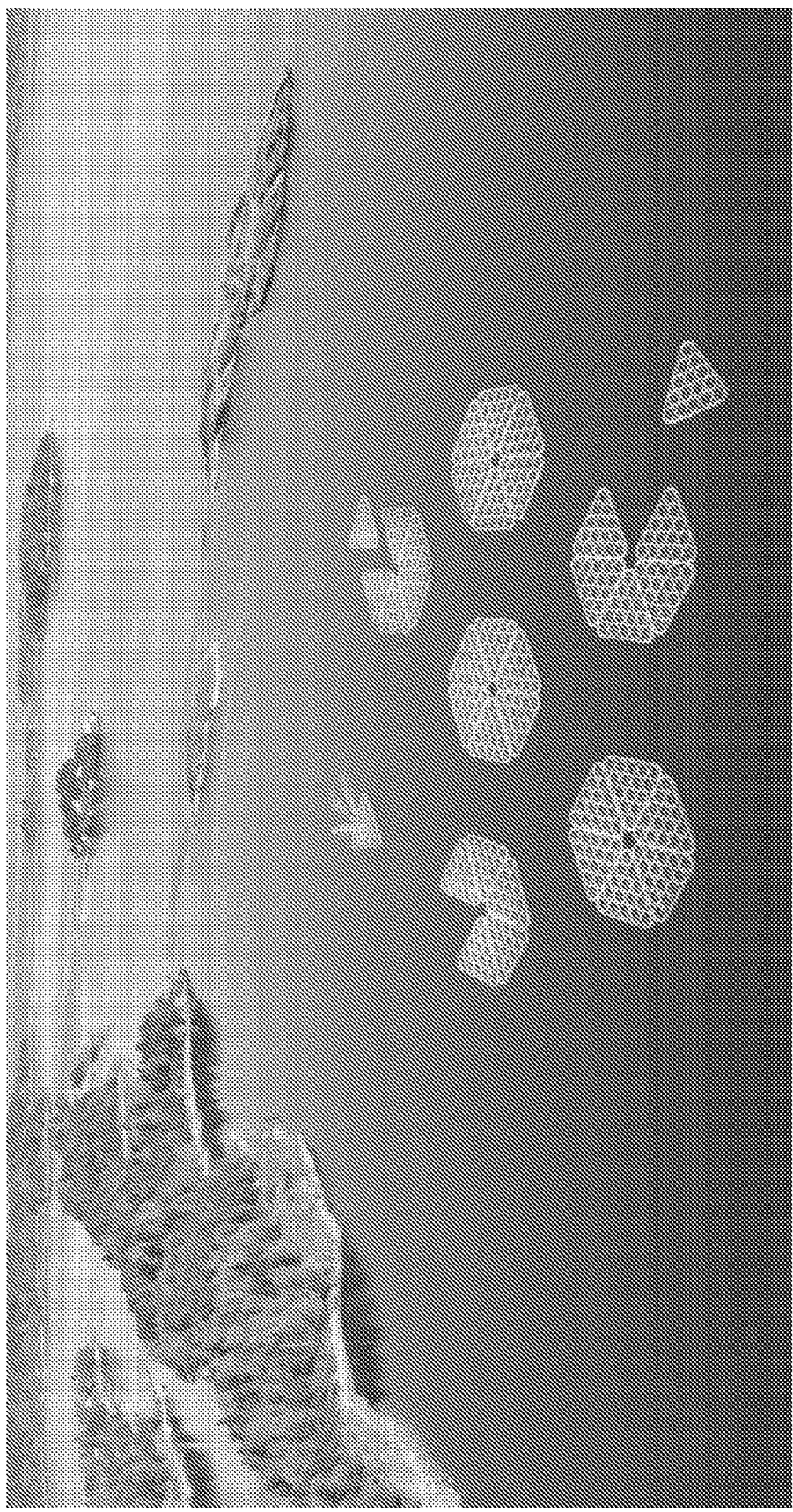
FIG. 10 shows stationary and ambulatory clusters of production modules deployed across a stretch of water.

A cluster of production modules may be given any shape, provided it is compatible with packing of the individual production modules side by side. When production modules are arranged in hexagonal close packed (HCP) arrangements, the natural outline shapes of the clusters can have trigonal or hexagonal symmetries as illustrated in FIG. 5 and FIGS. 6a-c, but other geometries also are possible, e.g., linear as in FIG. 4, circular, etc. An important consequence of the mutually independent nature of individual production modules is scalability: This implies that production modules can be simply added to or removed from a given cluster, and clusters of standardized size and shape such as the triangles shown in FIG. 5 can be linked to other clusters to create macroscale structures, cf. FIG. 8 and FIG. 9. A cluster of production modules may constitute a mobile, self-contained facility which can be moved from one locale to another and tethered there, or function as a roving production platform, cf. FIG. 10.

Figure 11A:
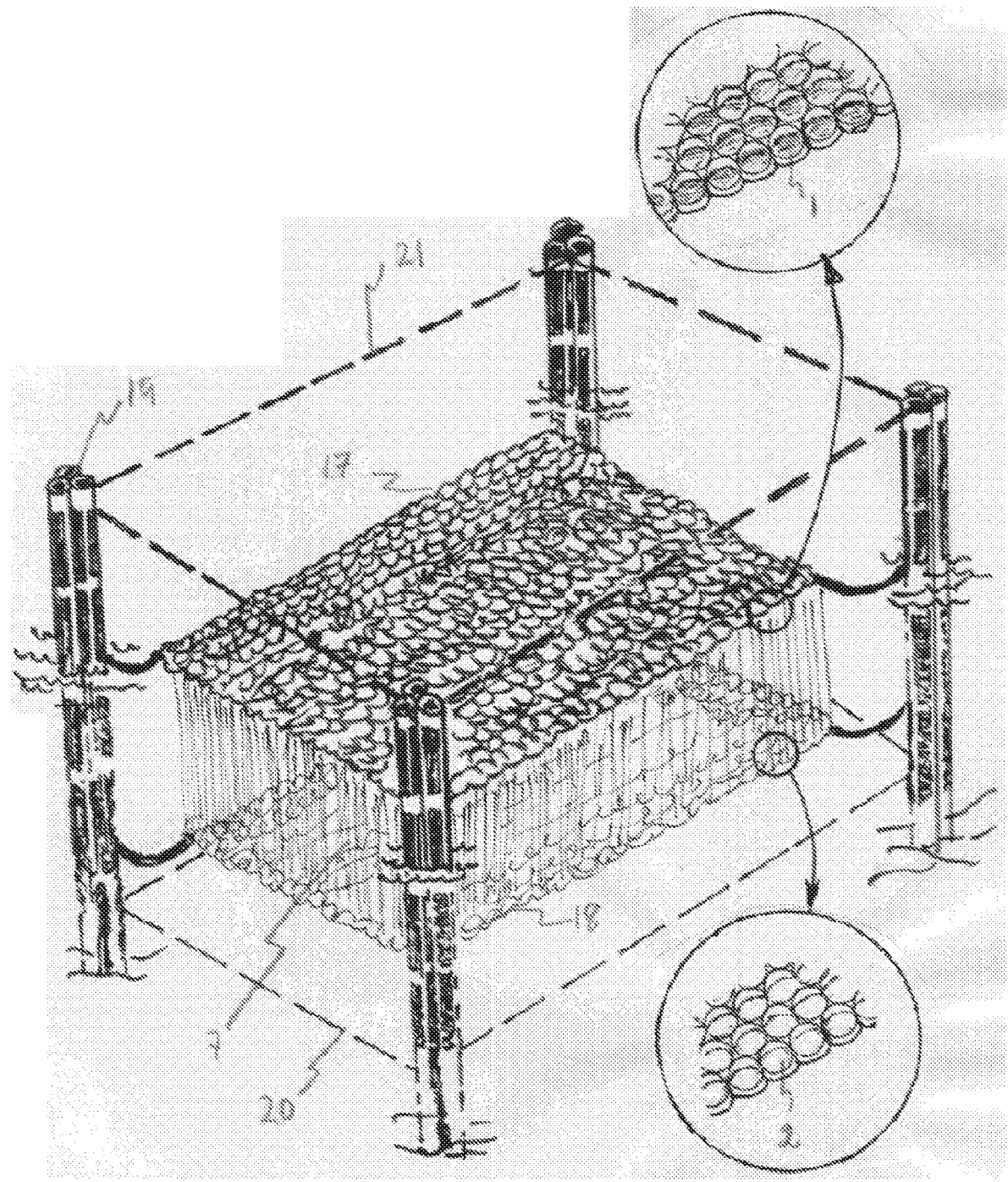
FIG. 11a shows a marine production facility established around a rectangular cluster of production modules.

FIGS. 11a and b show an example of a more complex production facility where the growth surfaces (7) extend between rectangular clusters of upper parts (1) and lower parts (2) that constitute an upper floor (17) floating on the surface and a lower floor (18) directly below, tethered via 4 pillars (19). The facility includes a sub-floor (20) and a roof structure (21). The sub-floor (20) is indicated by the stippled rectangle in FIG. 11a and is also shown in a side view in FIG. 11b. It is typically supported by the pillars surrounding the facility, either as a stiff structure fixed to the pillars or as a suspended sheet anchored on the pillars. In certain cases, the sub-floor may be positioned directly on the sea floor. Typical functions of the sub-floor are:

Collect waste products from the production volume above as well as biomass that is lost from growth substrates during the growth period and during harvesting.

Provide a habitat for bottom-living organisms that feed off the waste products from the production volume above.

Increase the overall structural strength of the entire facility.

Figure 11B:
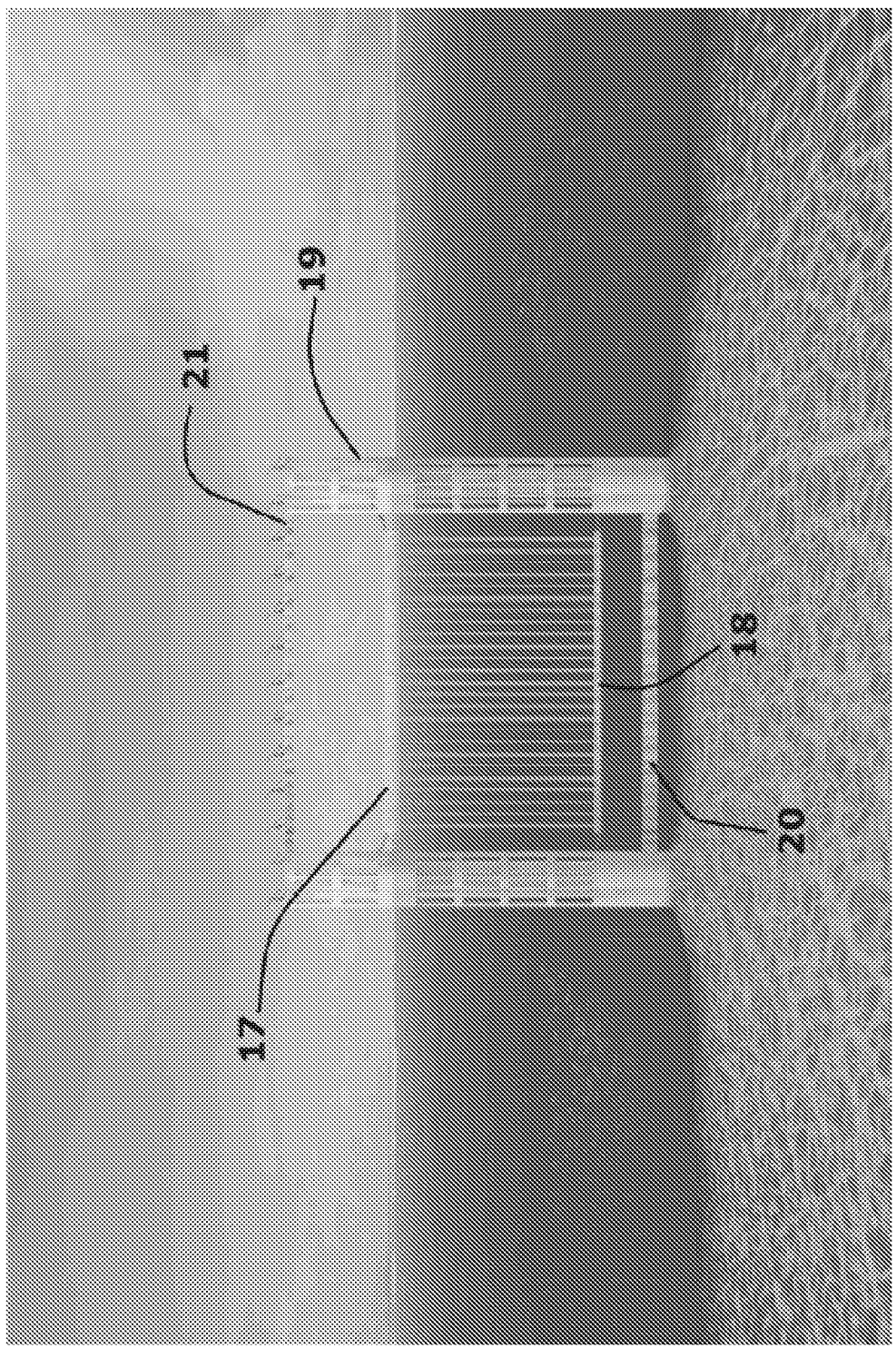
FIG. 11b shows a perspective view of a production facility.

The roof structure (21) is indicated by the stippled rectangle in FIG. 11a and is also shown in a side view in FIG. 11b. When installed, it is carried by the pillars or walls surrounding the production facility, but it may alternatively be mounted onto and supported by the platform itself. The roof can have many functions:

Protecting the working environment on the production facility against sun, rain and snow.

Providing a platform for technical installations, e.g., solar panels as shown in FIG. 11b.

Providing areas for growing light-dependent cultures such as algae.

Figure 12A:
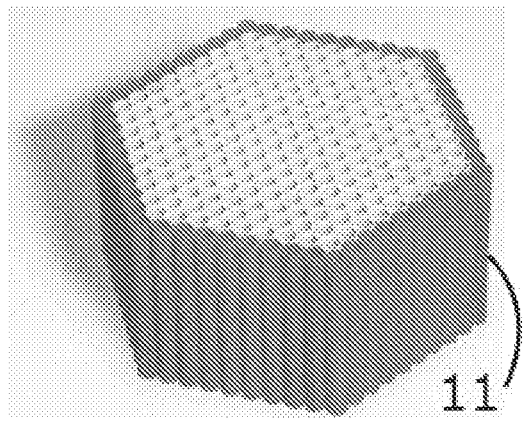
FIGS. 12a and 12b illustrate a freestanding and a floating hexagonal cluster of production modules where growth surfaces are surrounded by a perimeter wall.

In many cases, it is desirable to include a perimeter structure around a cluster of production modules. This may be for improving the structural integrity of the bioproduction facility as well as for enclosing a volume of water. In FIGS. 12a,b are shown perspective views of a freestanding and a floating hexagonal cluster of production modules where an internal volume containing growth surfaces are surrounded by a perimeter wall consisting of closed cylindrical tanks (11) positioned side by side. This enables complete control of the environment within the facility, avoids cross contamination between the water inside and outside, and protects the interior from wave action. In certain cases involving light-averse organisms, a light tight cover may be attached across the top of the cluster.

Figure 12B:
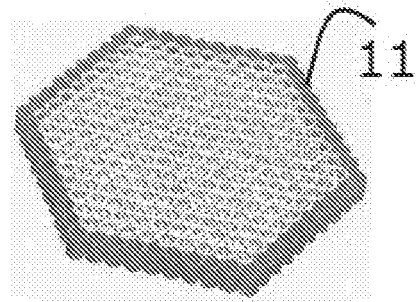
Figure 12C:
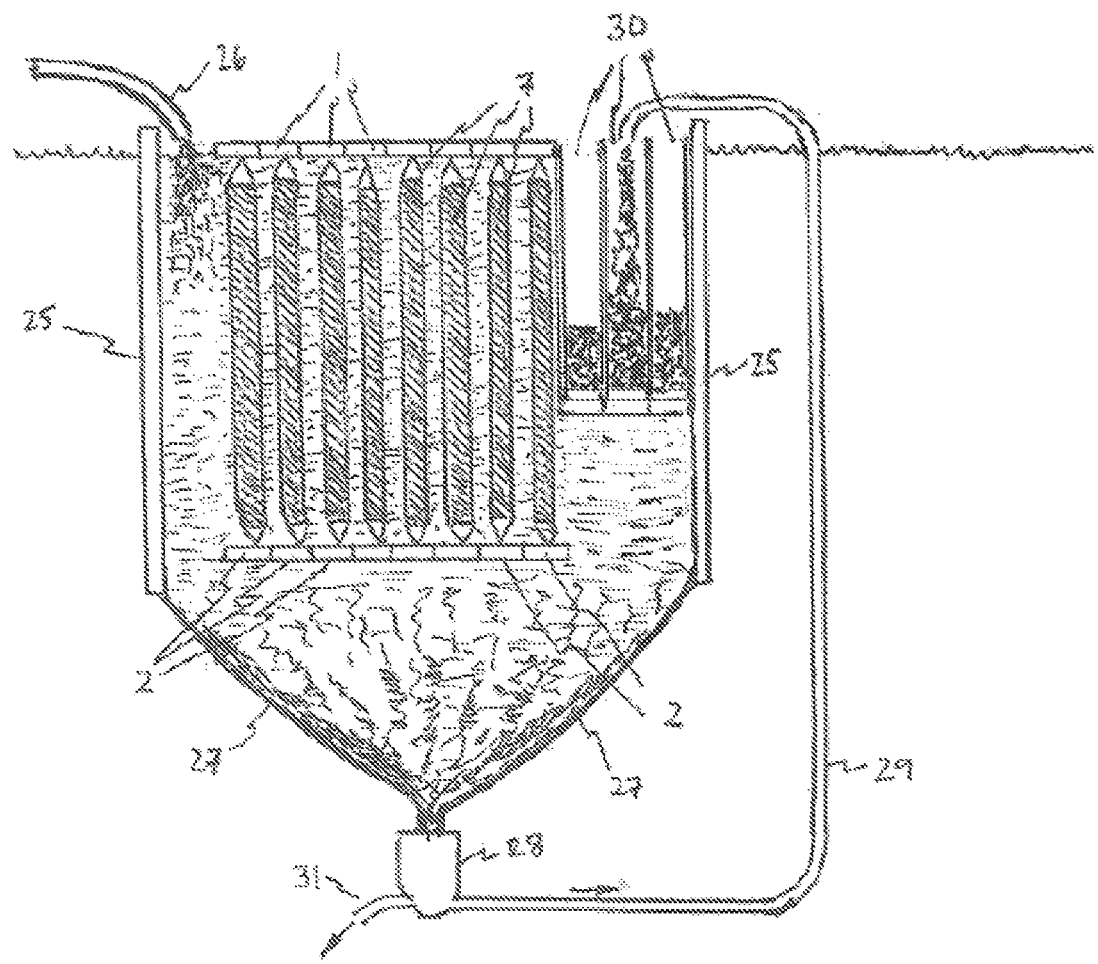
FIG. 12c shows a combined sediment trap and biofilter.

FIG. 12c shows a combined sediment trap and biofilter for particulates: A closed wall perimeter structure (25) surrounds a cluster of production modules of two types: In the first type each production module contains a growth surface (7) loaded with sessile filter-feeding organisms, stretched out between the upper (1) and lower (2) parts of the production module. In the second type, each production module contains a collection tank (30). Water with fractions of coarse and fine particles enters through an inlet tube (26) and spreads throughout the enclosed volume. The coarse fractions of the particulates sediment quickly and are collected by a funnel-shaped collection surface (27), e.g. a plastic sheet, which surrounds the bottom of the enclosed volume as shown. The finer fractions of particulates sediment slowly and float in the water through the volume occupied by the growth surfaces, where they are fed upon by the filtering organisms. Fecal matter produced by the filtering organisms sediment to the bottom of the enclosed volume and is collected by the collection surface (27). Sediments near the collection surface are transported by gravity and water flow towards the funnel at the bottom, which feeds into a separation and pumping device (28). Concentrated particulates are pumped via a tube (29) into a collection tank (30) for further processing, while purified water is directed through another tube (31). The system shown in FIG. 12c can be employed in water purification, and the collected sediments may represent significant bioresources in addition to the biomass obtained by harvesting the organisms on the growth surfaces (7).

Figure 13A:
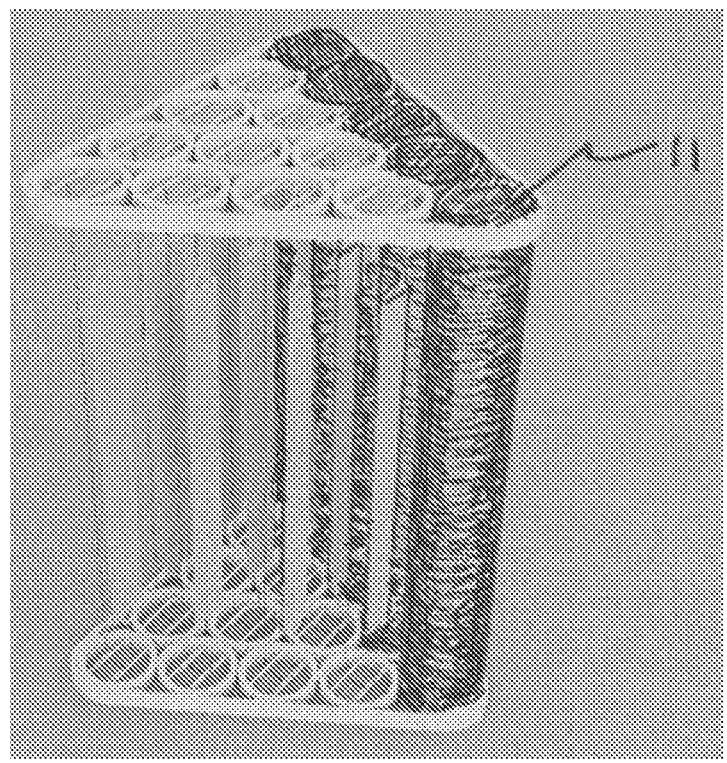
FIGS. 13a and 13b illustrate a triangular cluster of production modules where one side is closed by a perimeter wall.
Figure 13B:
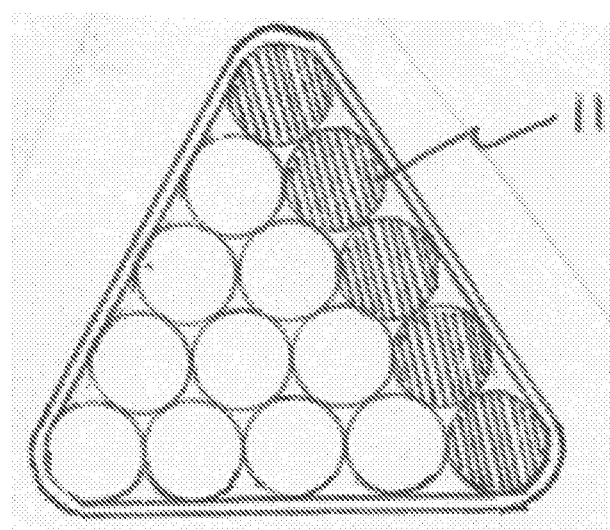
Figure 14:
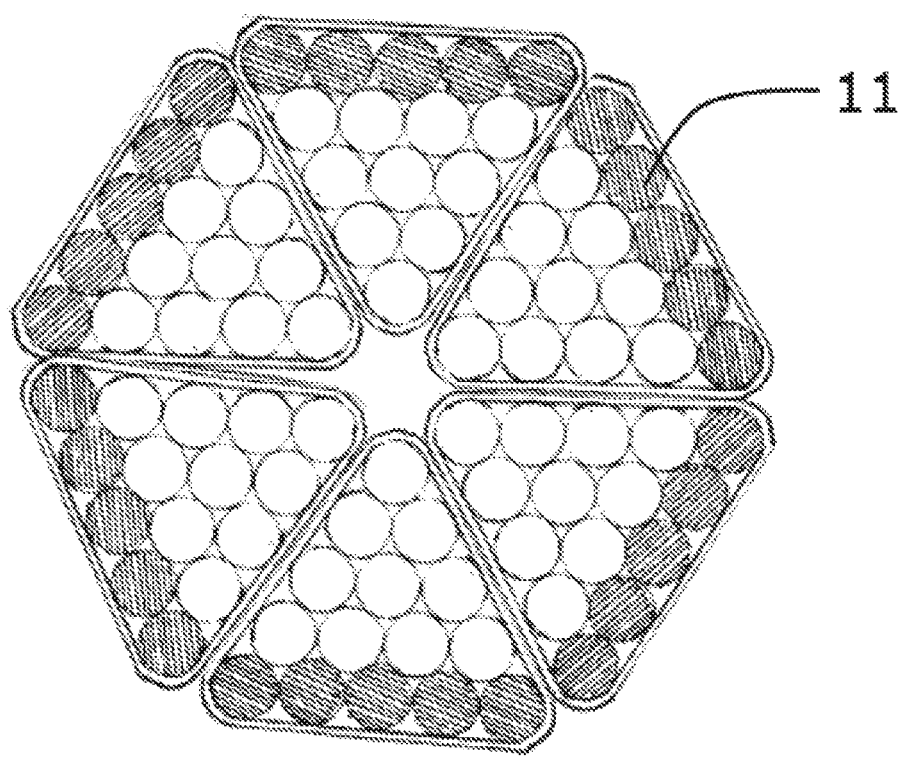
FIG. 14 shows a rosette-like enclosed macrostructure comprising triangular clusters of production modules with closed perimeter walls oriented outwards.
Figure 15:
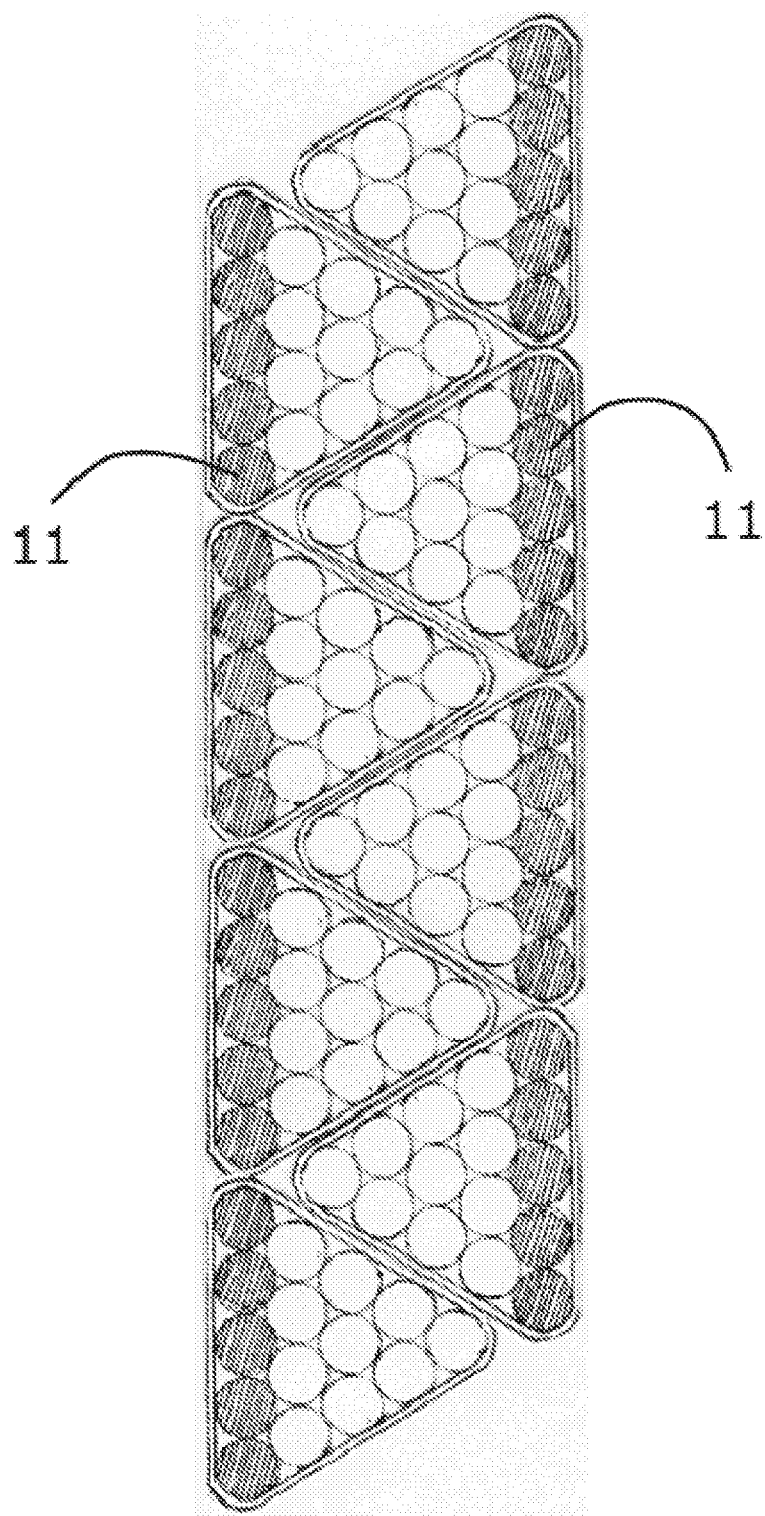
FIG. 15 shows a linear macrostructure comprising triangular clusters of production modules with closed perimeter walls oriented outwards.

FIGS. 13a,b show a triangular cluster where one side is closed to the surrounding water volume by a wall of closed production modules in the shape of cylindrical tanks (11). Alternative ways of closing one side of the triangle include barrier sheets or curtains mounted between corner pillars (cf. pillars shown in FIG. 12), etc. Such clusters may be combined in a variety of ways to form larger scale facilities with extended perimeter structures that constitute barriers against water exchange. An example is shown in FIG. 14, where six triangular clusters are arranged in a rosette-like macrostructure with tanks (11) forming the closed walls in the triangular clusters facing outwards to form an enclosing barrier around the perimeter. In FIG. 15, similar triangular clusters are linked to form a linear macrostructure with a communicating volume enclosed by a wall of tanks (11) on either side: The macrostructure presents a barrier wall in the direction perpendicular to its length dimension, and an internal flowpath along its length. Clusters of similar or different shapes and sizes can be employed according to the same principle to create macrostructures with watercourses for guiding and controlling flows of nutrients and waste.

Figure 16A:
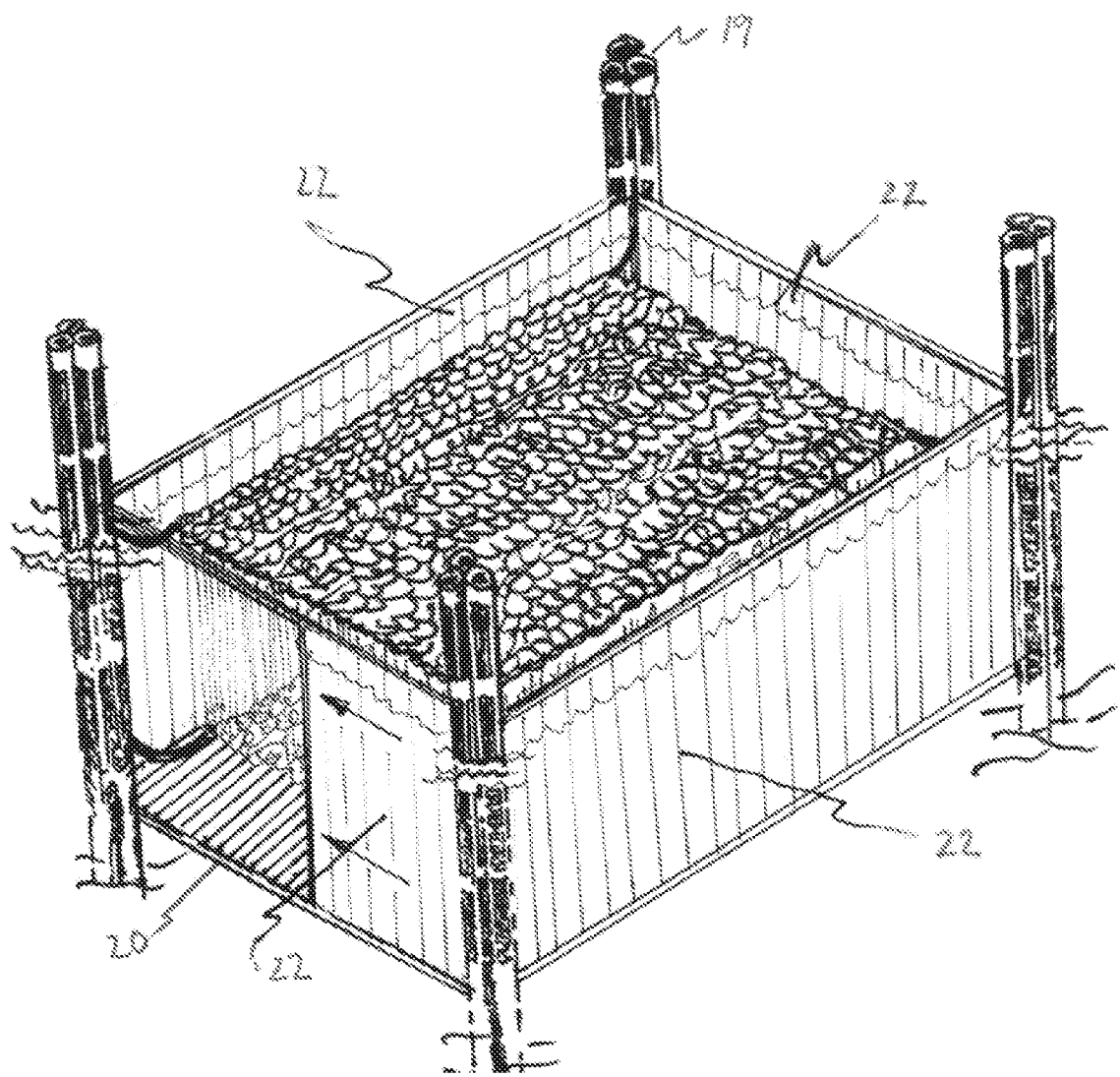
FIG. 16a shows a marine production facility established around a rectangular cluster of production modules, where the facility can be closed off from the surrounding masses of water by a curtain-like barrier.
Figure 16B:
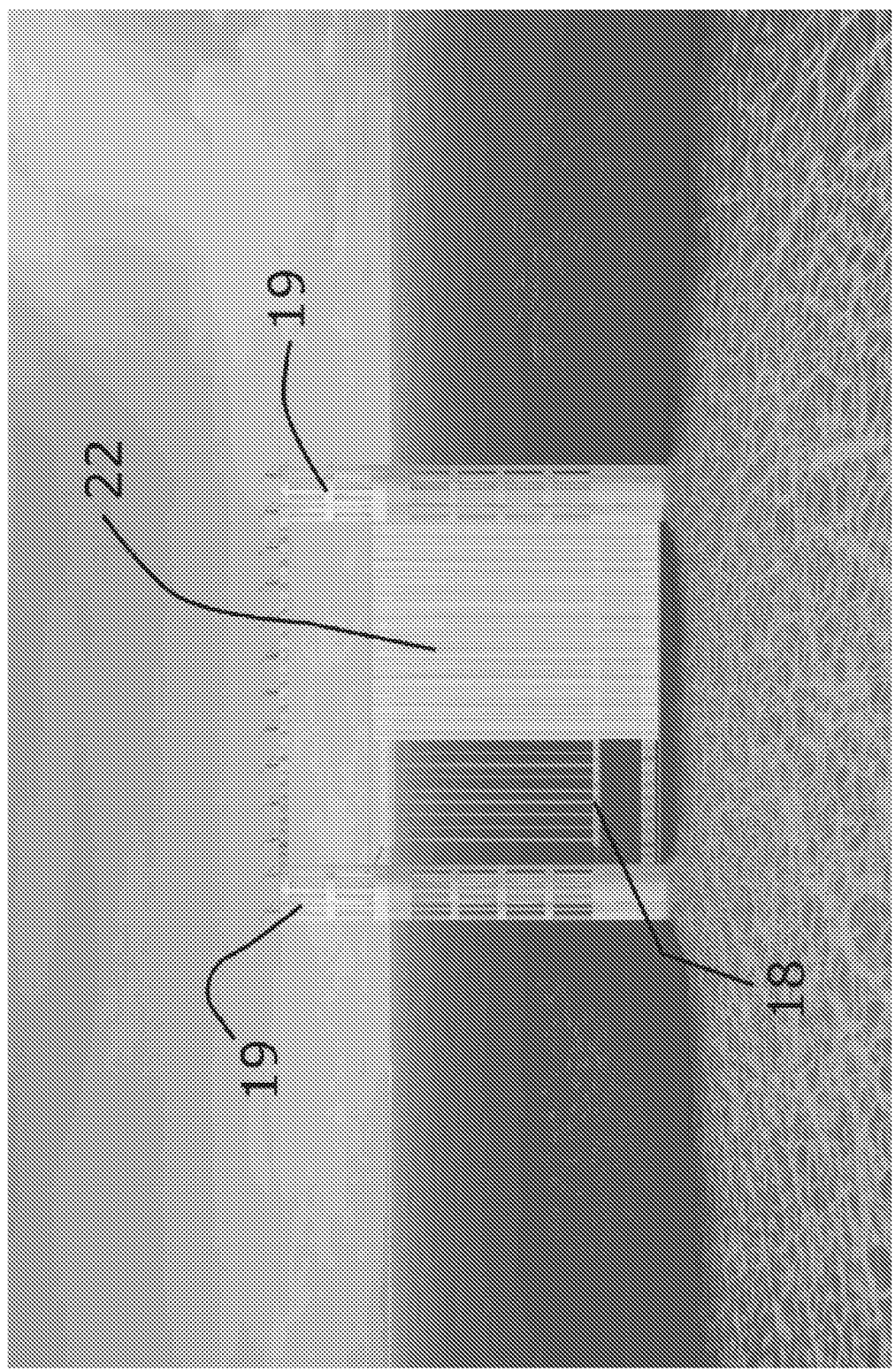

Another example of enclosing the bioproduction facility is shown in FIGS. 16 *a* and *b*. Here, the whole water volume between the pillars (19) can be closed off from the surrounding masses of water by drawing a curtain (22) between each pair of pillars, extending from the lower floor (18) or the sub-floor (20) and to a point above the waterline. In FIG. 16 *a*, the curtains (22) are drawn in a horizontal direction to effect closure or opening. Partial enclosure is achieved when curtains are drawn vertically from the sub-floor and to a point below the waterline. This allows the upper strata of the production volume in the facility to be exposed to the surrounding water volume while avoiding disturbing the habitat on the sub-floor.

Figure 17:
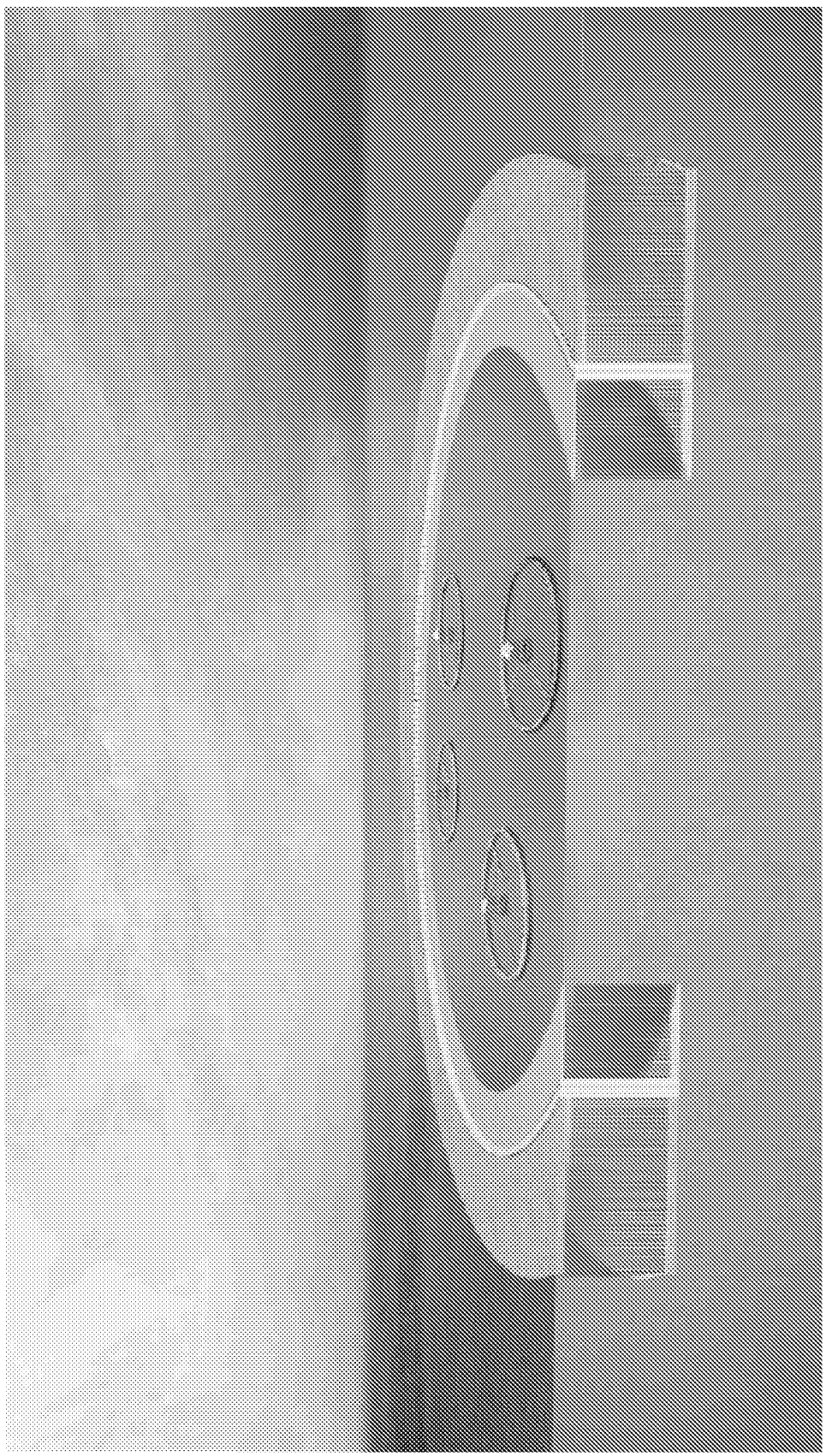
FIG. 17 shows a vertical cut view of a macrostructure comprising various types of linked production modules enclosing four fish farming ponds.
Figure 18:
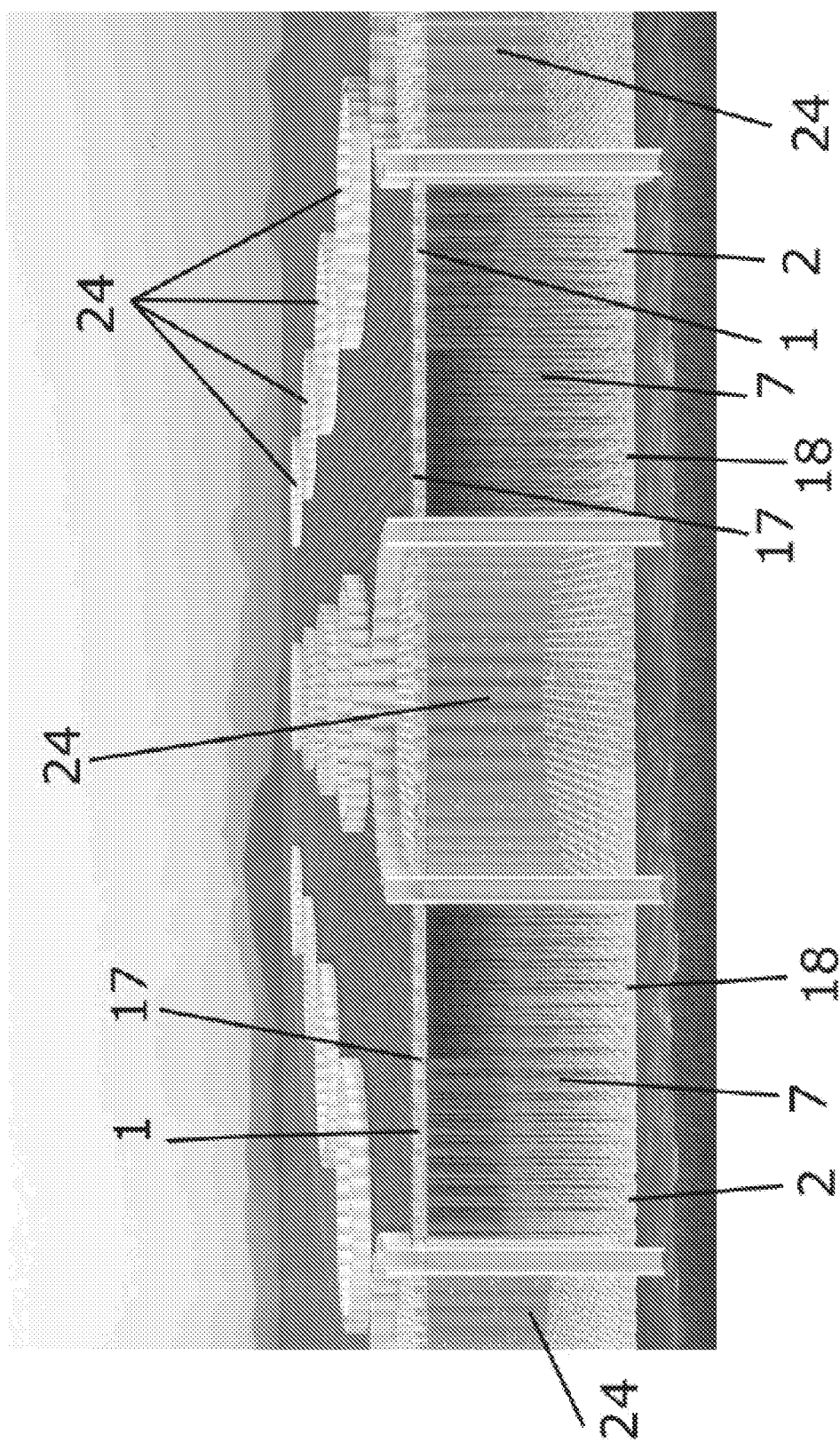
FIG. 18 shows a vertical cut-away view of multiple macrostructures comprising various types of linked production modules in combination with fish farming tanks and agricultural areas.

The modular concept of the present invention lends itself well to the construction of very large scale macrostructures where basic modules in the form of open or closed production modules and walls are linked across stretches of water and into the depths below to form three dimensional habitats and production facilities. FIG. 17 shows an example of a complex production facility where an enclosed fish farming space is surrounded by macroscale cluster structures forming upper (17) and lower (18) floors with suspended growth surfaces (7) between them. FIG. 18 shows a large scale combined facility where fish are farmed in cylindrical enclosures (24) and where the volume of water between the cylindrical enclosures is filled with growth substrates (7) stretched between an upper floor (17) of surface floating parts (1) and a lower floor (18) of lower parts (2). The area on top is dedicated to agriculture. By extension, it is clear that floating production facilities of any shape and size can be realized employing principles and basic modules as per the present invention.

The invention claimed is:

1. A marine bioproduction facility for farming of sessile marine organisms in a body of water with a water surface, wherein the facility comprises at least one cluster, wherein said at least one cluster comprises at least two production modules, the production modules of the at least one cluster being arranged side by side in a two-dimensional scalable and selectable pattern, confined within a vertical column with a pre-defined horizontal cross section and extending downwardly from the water surface, each production module being configured to be operated independently of another production module, and at least one of the at least two production modules includes at least one growth surface for sessile marine organisms, each production module comprising:

an upper part comprising at least one opening configured to allow individual access to the vertical column in which the production module is arranged, and a ring structure around the opening having a positive buoyancy in water, an outer circumference of the ring structure having one of the following shapes: polygonal, circular and elliptical, and wherein the at least one production module includes fixture and suspension structure for attachment, deployment, and recovery of the at least one growth surface for sessile marine organisms through the opening in the upper part.

2. The marine bioproduction facility according to claim 1, wherein the fixture and suspension structure comprises a mounting fixture arranged on the upper part, the at least one growth surface being connected to the mounting fixture, and the mounting fixture being configured to pay out and suspend the at least one growth surface.

3. The marine bioproduction facility according to claim 1, further comprising guiding structure configured to keep the at least one growth surface within a corresponding vertical column.

4. The marine bioproduction facility according to claim 3, wherein the guiding structure comprises a weight connected to the at least one growth surface to extend the at least one growth surface within the corresponding vertical column.

5. The marine bioproduction facility according to claim 1, wherein the at least one of the at least two production modules comprises at least one of: a tank with a tank volume, and technical equipment.

6. The marine bioproduction facility according to claim 1, wherein the at least one production module comprises a lower part configured to be arranged below the upper part.

7. The marine bioproduction facility according to claim 3, wherein the guiding structure comprises a retaining fixture arranged on a lower part of the at least one production module, the retaining fixture including a guiding ring for attaching the at least one growth surface to the lower part.

8. The marine bioproduction facility according to claim 3, wherein the growth surface is connected at a lower end to a cable which passes via a retaining fixture arranged on a lower part of the at least one production module and returns to a take-up fixture on the upper part.

9. The marine bioproduction facility according to claim 6, the lower part of the at least one production module further comprising a ring structure with an outer circumference having one of the following shapes: polygonal, circular and elliptical.

10. The marine bioproduction facility according to claim 9, wherein the guiding structure comprises the ring structure of the lower part, and the at least one growth surface or a cable connected thereto passes through the ring structure.

11. The marine bioproduction facility according to claim 6, wherein the lower part has a negative buoyancy in water.

12. The marine bioproduction facility according to claim 3, wherein the fixture and suspension structure is arranged on the upper and lower parts of the at least one production module and is configured to stretch the at least one growth surface between the upper and lower parts for deploying and retrieving the at least one growth surface through the opening in the upper part.

13. The marine bioproduction facility according to claim 1, the at least one growth surface for sessile organisms being at least one of: sectioned as a function of depth in the vertical column, and formed as a helical strip configured to be rotated about its vertical axis for causing movement of water in the body of water.

14. The marine bioproduction facility according to claim 5, wherein the tank volume is configured to be accessed via the opening of the corresponding upper part.

15. The marine bioproduction facility according to claim 1, wherein the two-dimensional scalable and selectable pattern is one of the following: random, serpentine, linear, triangular, square, and hexagonal close-packed (HCP).

16. The marine bioproduction facility according to claim 1, wherein the at least one cluster has a polygonally-shaped circumference having one of the following shapes: triangle, square, rectangle, pentagon, and hexagon.

17. The marine bioproduction facility according to claim 1, wherein each production module is mechanically linked to at least one neighboring production module.

18. The marine bioproduction facility according to claim 1, further comprising an upper floor arranged to be floating at or near the surface of the water, and wherein the upper floor comprises the upper parts of at least two production modules.

19. The marine bioproduction facility according to claim 18, wherein the upper floor comprises buoyancy modules for providing buoyancy to the upper floor.

20. The marine bioproduction facility according to claim 7, further comprising a lower floor arranged to be submerged in the body of water, wherein the lower floor comprises the lower parts of at least two production modules.

21. The marine bioproduction facility according to claim 14, wherein the facility further comprises a sub-floor arranged below the at least one cluster, and the sub-floor is configured for at least one of the following: collecting waste products, providing a habitat for bottom-living organisms, and increasing the structural strength of the facility.

22. The marine bioproduction facility according to claim 21, wherein the sub-floor further comprises one of the following: a mechanically stiff platform of annuli, tanks or cylinders linked side by side and adapted for carrying collection surfaces, and a sheet suspended below the cluster.

23. The marine bioproduction facility according to claim 14, the facility further comprising a roof structure arranged above the at least one cluster and being configured to provide at least one of the following: environmental protection, a platform for technical installations, an area for growing light dependent cultures, and a solar power collector.

24. The marine bioproduction facility according to claim 1, wherein each of the at least two production modules is assigned a unique production module address identifying its location in the facility.

25. The marine bioproduction facility according to claim 1, wherein at least one growth surface is sectioned and wherein each section is assigned a unique section address identifying its location in the corresponding production module.

26. The marine bioproduction facility according to claim 23, wherein the at least one cluster is assigned a unique cluster address identifying its location in the facility.

27. The marine bioproduction facility according to claim 14, wherein the facility comprises a perimeter structure at least partly surrounding the at least one cluster.

28. The marine bioproduction facility according to claim 27, wherein the perimeter structure is one of the following: a linked structure configured to float and surround the cluster in two dimensions, and a closed barrier structure configured to envelop the cluster partly or completely in the water.

29. The marine bioproduction facility according to claim 1, wherein the facility comprises at least one macroscale structure including at least two clusters that are mechanically linked.

30. The marine bioproduction facility according to claim 29, wherein the at least one macroscale structure comprises at least one cluster with a polygonally-shaped circumference.

31. The marine bioproduction facility according to claim 29, wherein the at least one macroscale structure comprises two or more triangular clusters.

32. The marine bioproduction facility according to claim 1, wherein at least one side of a polygonal cluster is closed to surrounding water by a barrier comprising at least one of the following: a number of closed production modules in the shape of cylindrical tanks linked side by side, a sheet, and a curtain.

33. The marine bioproduction facility according to claim 31, wherein the at least one macroscale structure comprises at least two triangular clusters arranged such that closed sides of at least two polygonal clusters connect to form an extended closed barrier.

34. A method for growth and harvesting of marine sessile organisms using a marine bioproduction facility according to claim 1, the method comprising:
    defining actions according to a schedule pertaining to a production module,
    exposing the upper part of the production module in preparation for insertion of the growth surface,
    inserting the growth surface into the production module through the opening in its upper part,
    connecting the growth surface to fixtures on the upper part of the production module,
    incubating the growth surface in the production module for an incubation period,
    extracting the growth surface from the production module by pulling it up through the opening in the upper part, and
    removing and collecting biomass from the growth surface.

35. The method for growth and harvesting of marine sessile organisms according to claim 34, before exposing the upper part, further comprising:
    identifying a physical location of one or more of:
        a cluster, using a unique address assigned to the cluster,
        a production module, using a unique address assigned to the production module, and
        a growth surface section, using a unique address assigned to the section.

36. The method for growth and harvesting of marine sessile organisms according to claim 34, wherein the removing and collecting of biomass from the growth surface is performed by at least one of the following processes: scraping, brushing, blowing, suction, shaking, and beating.

37. The method for growth and harvesting of marine sessile organisms according to claim 34, comprising, before incubating the growth surface:
    connecting the growth surface to fixtures on the lower part of the production module, and
    stretching the growth surface between the upper and lower parts on the production module.

38. The method for growth and harvesting of marine sessile organisms according to claim 34, further comprising pre-seeding the growth surface with one of: larvae or juveniles of the sessile marine organisms, before inserting it into the production module.

39. The method for growth and harvesting of marine sessile organisms according to claim 34, wherein at least one of the steps is performed by automated equipment.

40. The method for growth and harvesting of marine sessile organisms using a marine bioproduction facility according to claim 35, wherein at least one of the steps is performed by a mobile robot.

41. The method for growth and harvesting of marine sessile organisms according to claim 34, further comprising covering the upper part of one or more production modules by one of: a removable light tight lid, shroud, tarp or housing, for protection from light during the incubation period.

* * * * *